US006380470B1

(12) United States Patent
Fujiwara et al.

(10) Patent No.: US 6,380,470 B1
(45) Date of Patent: Apr. 30, 2002

(54) TRAINING SYSTEM FOR MUSIC PERFORMANCE, KEYBOARD MUSICAL INSTRUMENT EQUIPPED THEREWITH AND TRAINING KEYBOARD

(75) Inventors: Yuji Fujiwara; Kiyoshi Kawamura; Taro Kawabata, all of Shizuoka (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/547,279

(22) Filed: Apr. 11, 2000

(30) Foreign Application Priority Data

Apr. 13, 1999 (JP) .......................................... 11-105762
Jun. 25, 1999 (JP) .......................................... 11-180676
Feb. 10, 2000 (JP) .......................................... 2000-034098

(51) Int. Cl.[7] .............................................. G09B 15/00
(52) U.S. Cl. ...................................... 84/470 R; 84/478
(58) Field of Search ......................... 84/470 R, 477 R, 84/478

(56) References Cited

U.S. PATENT DOCUMENTS 4,794,840 A 1/1989 Isashi
5,392,682 A * 2/1995 McCartney-Hoy ........ 84/470 R
5,557,055 A * 9/1996 Breitweiser, Jr. ............ 84/478
5,907,115 A * 5/1999 Matsunaga et al. ....... 84/477 R
6,025,551 A * 2/2000 Munekawa et al. ....... 84/477 R
6,037,534 A * 3/2000 Yasutoshi et al. ......... 84/477 R
6,087,577 A * 7/2000 Yahata et al.

FOREIGN PATENT DOCUMENTS

JP 5-40474 2/1993
JP 7-261750 10/1995

* cited by examiner

*Primary Examiner*—Jeffrey Donels
(74) *Attorney, Agent, or Firm*—Morrison & Foerster

(57) ABSTRACT

A keyboard musical instrument has keys equal to a multiple of five assigned to the fingers of a trainee, an electric tutor and an electronic sound generating system, and the electric tutor gives the trainee guide in practicing the fingering along a passage, wherein the electronic sound generating system generates the tones when the trainee satisfies predetermined conditions for the training so as to correctly guide him in the practice.

39 Claims, 15 Drawing Sheets

| ADDERSS | MUSIC DATA | STATUS | Δt | NOTE No. | VELOCITY | FINGER |
|---|---|---|---|---|---|---|
| R1 | DURATION | — | 4 | — | — | — |
| R2 | EVENT | key pressure | — | — | — | 1 |
| R3 | DURATION | — | 6 | — | — | — |
| R4 | EVENT | note on | — | 60 | 65 | — |
| R5 | DURATION | — | 12 | — | — | — |
| R6 | EVENT | note off | — | 60 | 64 | — |
| R7 | DURATION | — | 8 | — | — | — |
| R8 | EVENT | key pressure | — | — | — | 3 |
| R9 | DURATION | — | 6 | — | — | — |
| R10 | EVENT | note on | — | 60 | 82 | — |
| R11 | DURATION | — | 24 | — | — | — |
| R12 | EVENT | note off | — | 60 | 64 | — |
| ⋮ | | ⋮ | ⋮ | ⋮ | ⋮ | ⋮ |
| Rn | END | — | — | — | — | — |

Fig. 3A

| ADDERSS | MUSIC DATA | STATUS | Δt | NOTE No. | VELOCITY | FINGER |
|---|---|---|---|---|---|---|
| L1 | DURATION | — | 12 | — | — | — |
| L2 | EVENT | key pressure | — | — | — | 5 |
| L3 | DURATION | — | 6 | — | — | — |
| L4 | EVENT | note on | — | 48 | 52 | — |
| L5 | DURATION | — | 32 | — | — | — |
| L6 | EVENT | note off | — | 48 | 64 | — |
| L7 | DURATION | — | 2 | — | — | — |
| L8 | EVENT | key pressure | — | — | — | 3 |
| L9 | DURATION | — | 6 | — | — | — |
| L10 | EVENT | note on | — | 54 | 72 | — |
| L11 | DURATION | — | 18 | — | — | — |
| L12 | EVENT | note off | — | 54 | 64 | — |
| ⋮ | | ⋮ | ⋮ | ⋮ | ⋮ | ⋮ |
| Ln | END | — | — | — | — | — |

Fig. 3B

TRAINING SYSTEM FOR MUSIC PERFORMANCE, KEYBOARD MUSICAL INSTRUMENT EQUIPPED THEREWITH AND TRAINING KEYBOARD

FIELD OF THE INVENTION

This invention relates to a music performance training system and, more particularly, to a training system for music performance, a keyboard musical instrument equipped with the training system and a training keyboard.

DESCRIPTION OF THE RELATED ART

A typical example of the music performance training system sequentially notices a player of keys to be depressed. The notice is given through an array of optical indicators. In detail, the prior art music performance training system is installed in an acoustic piano, which is usually equipped with eighty-eight black/white keys. The eighty-eight black/white keys are assigned pitch names, respectively, and the optical indicators are placed on or in the vicinity of the eighty-eight black/white keys. Therefore, eighty-eight optical indicators are required for the keyboard. The eighty-eight optical indicators are connected to a controller, and the controller sequentially energizes the optical indicators associated with the keys to be depressed. The player depresses the keys, and practices a tune on the keyboard. Thus, the prior art music performance training system guides the player for the practice in fingering on the keyboard.

The prior art music performance training system is not bad for a player who has practiced the acoustic piano for some time past. However, beginners feel the prior art music performance training system hard to follow. The reason why the beginners feel hard is that the optical indicators are too many to quickly search them for the radiation. In other words, the prior art music performance training system is appropriate to a player who has born most of the music score in mind. Thus, the prior art music performance training system is not suitable for the beginners.

SUMMARY OF THE INVENTION

It is therefore an important object of the present invention to provide a training system, which is suitable for stepwise improving skills of music performance.

It is also an important object of the present invention to provide a keyboard musical instrument equipped with the training system.

It is yet another object of the present invention to provide a training keyboard, which allows a trainee to stepwise improve skills.

The present inventors contemplated the problem inherent in the prior art music performance training system, and noticed that beginners were expected to have born the relation between the pitch names and the keys in mind before practicing the fingering. However, it was not easy to bear the relation in mind. The present inventors concluded that the beginners had to practice the fingering on the keyboard without change of the finger positions.

In accordance with one aspect of the present invention, there is provided a training system for music performance comprising an electric tutor guiding a trainee in fingering on plural keys along a passage and checking the plural keys to see whether or not the trainee manipulates keys on a predetermined side with respect to a key previously manipulated in at least one educational mode, and a sound generating system cooperating with the electric tutor in the aforesaid at least one educational mode and generating a tone along the passage when the trainee manipulates one of the keys on the predetermined side. In accordance with another aspect of the present invention, there is provided a keyboard musical instrument selectively established in a performance mode and at least one educational mode, and the keyboard musical instrument comprises plural keys selectively depressed by a trainee along a passage in the aforesaid at least one educational mode and a training system including an electric tutor guiding a trainee in fingering on the plural keys along the passage and checking the plural keys to see whether or not the trainee depresses keys on a predetermined side with respect to a key previously depressed in the aforesaid at least one educational mode and a sound generating system cooperating with the electric tutor in the aforesaid at least one educational mode and generating a tone along the passage when the trainee depresses one of the keys on the predetermined side.

In accordance with yet another aspect of the present invention, there is provided a training keyboard for training a trainee in typing comprising plural keys respectively assigned to fingers of the trainee and respectively representing plural object groups each including plural objects, an electric tutor selectively specifying the plural keys to be manipulated for the objects respectively selected from the associated plural object groups and judging the keys manipulated by the trainee to see whether or not the trainee correctly manipulated the plural keys, and an interface between the electric tutor and the trainee for informing the trainee of the judgement made by the electric tutor.

BRIEF DESCRIPTION OF THE DRAWINGS

The features and advantages of the training system, the keyboard musical instrument and the training keyboard will be more clearly understood from the following description taken in conjunction with the accompanying drawings in which:

FIGS. 3A and 3B are views showing pieces of music data for guiding a player in practicing a tune;

DESCRIPTION OF THE PREFERRED EMBODIMENTS

First Embodiment

Structure of Keyboard Musical Instrument

Figure 1:
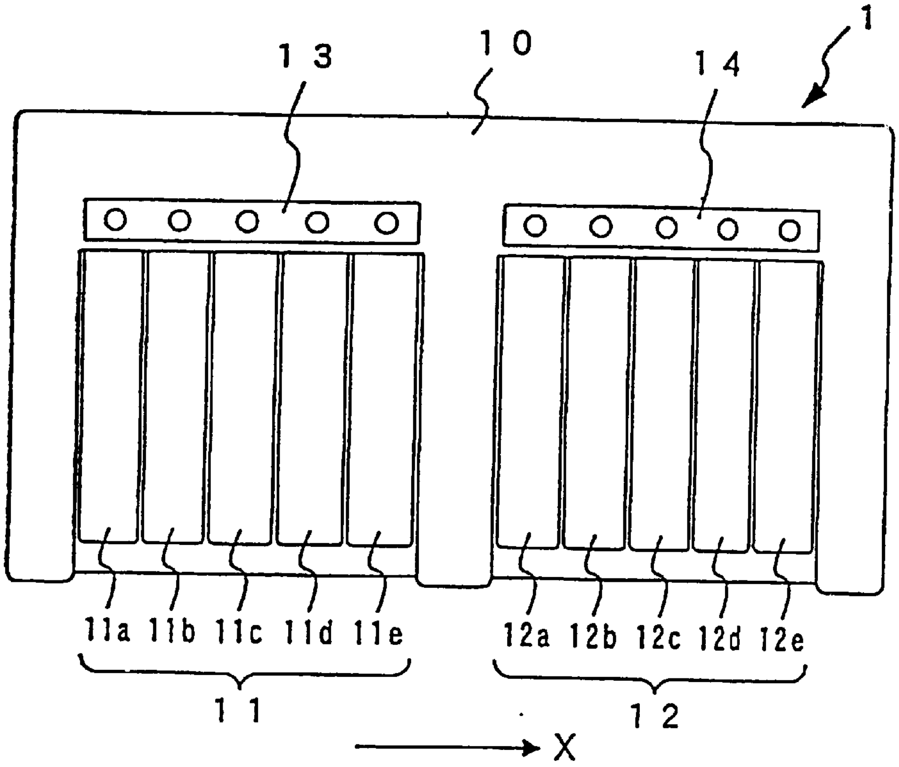
FIG. 1 is a plane view showing the appearance of a keyboard musical instrument according to the present invention.
Figure 2:
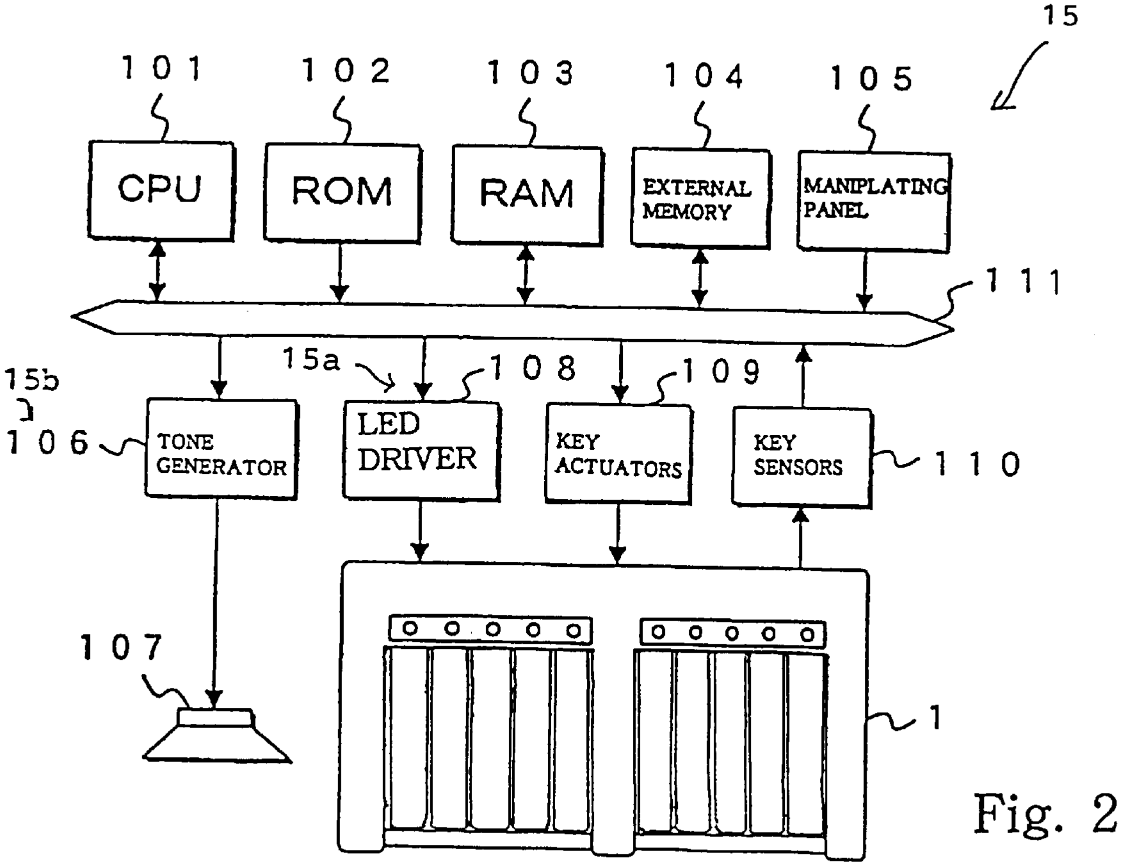
FIG. 2 is a block diagram showing the system components of a controller incorporated in the keyboard musical instrument.

Referring to FIG. 1 of the drawings, a keyboard musical instrument with a built-in music performance training system 1 comprises a housing 10, two sets 11/12 of keys 11*a*/11*b*/11*c*/11*d*/11*e* and 12*a*/12*b*/12*c*/12*d*/12*e*, two arrays of optical indicators 13/14 and a controller 15 (see FIG. 2). The sets of keys 11/12 are respectively provided for the left hand and the right hand, and the keys 11*a* to 11*e* and the keys 12*a* to 12*e* are assigned to the five fingers of the left hand and the five fingers of the right hands, respectively. Namely, the keys 11*a*/11*b*/11*c*/11*d*/11*e* are to be depressed with the little finger, the ring finger, the middle finger, the first finger and the thumb of the left hand, and the keys 12*a*/12*b*/12*c*/12*d*/12*e* are to be depressed with the thumb, the first finger, the middle finger, the ring finger and the little finger of the right hand.

Five optical indicators form the array 13, and are associated with the five keys 11*a* to 11*e*, respectively. Similarly, five optical indicators form the other array 14, and are associated with the five keys 12*a* to 12*e*. When one of the optical indicators 13/14 irradiates light, the keyboard musical instrument requests the player to depress the associated key 11*a*/11*b*/11*c*/11*d*/11*e*/12*a*/12*b*/12*c*/12*d*/12*e*. Thus, the keyboard musical instrument guides the player in practicing the fingering on the keys 11*a* to 11*e* and 12*a* to 12*e* through the arrays of optical indicators 13/14.

The keyboard musical instrument has plural modes of operation as will be described hereinlater. The keyboard musical instrument is assumed to be in one of the operation modes called as "five-finger exercise mode". The controller 15 checks the arrays of keys 11/12 to see whether or not the player depresses the key consistent with the key already noticed through the irradiant optical indicator. If the depressed key is consistent with the key to be depressed, the controller 15 electronically produces a tone.

Turning to FIG. 2 of the drawings, the controller 15 includes an electronic tutor 15*a* and an electronic sound generating system 15*b*. A central processing unit 101, a read only memory 102, a random access memory 103, a manipulating panel 105, key actuators 109, key sensors 110 and a bus system 111 are shared between the electronic tutor 15*a* and the electronic sound generating system 15*b*. The optical indicators 13/14 form parts of the electric tutor 15*a*. The central processing unit 101, the read only memory 102 and the random access memory 103 are respectively abbreviated as "CPU", "ROM" and "RAM" in FIG. 1.

The read only memory 102 serves as a program memory, and plural computer programs are stored in the read only memory 102. The central processing unit 101 sequentially fetches instruction codes through the bus system 111, and achieves jobs represented by the computer programs as will be hereinlater described in detail.

The random access memory 103 serves as a working memory, and predetermined areas are respectively assigned to pieces of music data and pieces of control data in the random access memory 103. Registers are defined in another area of the random access memory 103. The pieces of music data and the pieces of control data are transferred between the central processing unit 101, the random access memory 103 and the external memory 104 through the bus system 111. Flags are examples of the pieces of control data. Other pieces of control data are, by way of example, representative of the key status of the keys 11*a* to 11*e* and 12*a* to 12*e*. The keys previously depressed by a player are memorized in the data area of the random access memory 103.

There are several flags, which are referred to as "start flag SF", "part flag PF", "educational mode flag (R)" and "educational mode flag (L)". The registers are called as "register AD(R)", "register AD(L)", "register DU(R)", "register DU(L)", "register ADG(R)", "register ADG(L)", "DUG(R)" and "DUG(L)". The symbols (R) and (L) means the right part and the left part, respectively. The flags and registers are detailed after description on the manipulating panel 105. The flags and registers are hereinlater detailed after description on educational mode.

Various switches and dials are provided on the manipulating panel 105, and a player selectively manipulates the switches and the dials in order to give instructions to the controller 15. A switch is used for selecting a mode of operation. A player selects a timbre or timbres through the switches. Several kinds of percussion sounds are selectable by means of the switches on the manipulating panel. The player manipulates other switches to start and stop the selected computer program. The central processing unit 101 periodically checks the manipulating panel 105 to see whether or not the player manipulates any one of the switches. When the central processing unit 101 acknowledges the manipulation, the central processing unit 101 responds to the instruction given through the manipulating panel 105.

The key actuators 109 are respectively associated with the keys 11*a* to 11*e* and 12*a* to 12*e*, and move the associated keys 11*a* to 11*e* and 12*a* to 12*e* without fingering of the player.

The electronic tutor 15*a* further includes an external memory 104 and an LED (Light Emitting Diode) driver 108.

The external memory 104 is, by way of example, implemented by a magnetic information storage medium and a data read-out device. The magnetic information storage medium may be a CD-ROM (Compact Disk Read Only Memory). The pieces of music data are representative of a tune, and are stored in the external memory 104. When a player requests the electronic tutor 15*a* to guide him in the fingering, the central processing unit 101 instructs the external memory 104 to transfer the pieces of music data to the random access memory 103.

FIGS. 3A and 3B show pieces of music data for guiding a player in practicing a tune. Players perform a tune with both hands. The right hand fingers on the set of keys 12*a* to 12*e*, and the fingering is referred to as "right part" or "right part fingering". On the other hand, the left hand fingers on the set of keys 11*a* to 11*e*, and the fingering is referred to as "left part" or "left part fingering". FIG. 3A is the pieces of music data for guiding the right hand in practicing the tune, and FIG. 3B is the pieces of music data for guiding the left hand in practicing the tune.

The pieces of music data are broken down into duration data and event data. The event data represents three kinds of status, i.e., a note-on, a noteoff and a key pressure. A piece of duration data is indicative of a time interval Δt between two events. In FIGS. 3A and 3B, the pieces of duration data are alternated with the pieces of event data.

The note-on is representative of generation of a tone, and the central processing unit 101 specifies the pitch name and the loudness of the tone to be generated through the piece of event data. Although each of the keys of an acoustic piano is corresponding to one pitch name, the keyboard musical instrument implementing the first embodiment has ten keys 11*a* to 11*e* and 12*a* to 12*e* selectively assigned to more than ten pitch names such as eighty-eight pitch names. This means that the central processing unit has to specify the pitch of the tone to be generated. For this reason, the piece of event data representative of the note-on has a data field assigned to the pitch name or a note number and another data field assigned to the loudness or a velocity.

The note-off is representative of decay of the tone. In order to specify the tone to be decayed, the piece of event data representative of the note-off has the data fields respectively assigned to the note number and the velocity. The velocity is fixed to a default value. In this instance, the default value is "64".

The key pressure is representative of one of the five fingers to use for depressing the key 11*a*–11*e*/12*a*–12*e*. The thumb, the first finger, the middle finger, the ring finger and the little finger are numbered as "1", "2", "3", "4" and "5", respectively. As described hereinbefore, the ten keys 11*a* to 11*e* and 12*a* to 12*e* have been already assigned to the five fingers of the left hand and the five fingers of the right hand, respectively. For this reason, the piece of event data representative of the key pressure represents one of the keys to be depressed as well as the finger to use for depressing the key. In this instance, the central processing unit 101 instructs the LED (Light Emitting Diode) driver 108 to energize the optical indicator 13/14 associated with the key to be depressed. In order to direct the player to a key 11*a* to 11*e*/12*a*–12*e* to be depressed, it is necessary to give the player the notice before the timing to depress the key. For this reason, the piece of event data representative of the key pressure is antecedent to the associated piece of event data representative of the note-on. The time interval between the key pressure and the note-on is fixed to "6" in this instance.

Thus, the note-on and the note-off relate to a tone generation, and the key pressure relates to the notice. For this reason, the pieces of event data representative of the note-on and the note-off are referred to as "pieces of tone generation data", and the note-on and the note-off are referred to as "key event".

The pieces of duration data represent the lapse of time from the initiation of a guide. When the time to give an action comes, the central processing unit 101 reads out the piece of event data from the random access memory 103, and gives instructions on the basis of the piece of tone generation data to the tone generator 106 or the key actuators 109. When the central processing unit 101 reads out the piece of event data representative of the key pressure, the central processing unit 101 gives instructions to the LED driver 108 or the key actuators 109.

The LED driver 108 is responsive to the instructions based on the piece of event data representative of the key pressure. Assuming now that the central processing unit 101 reads out the piece of event data from the address R2 (see FIG. 3A), the piece of event data is indicative of the thumb of the right hand. The leftmost key 12*a* is to be depressed by the thumb. The central processing unit 101 instructs the LED actuator 108 to energize the leftmost optical indicator of the array 14. Then, the LED driver 108 energizes the leftmost optical indicator, and the left most indicator irradiates the light.

The key sensors 110 monitor the keys 11*a* to 11*e* and 12*a* to 12*e* to see whether or not the associated key changes the current position. When the key sensors 110 notice the associated keys 11*a* to 11*e*/12*a* to 12*e* change the current position, the key sensors 110 vary the magnitude of key position signals. The central processing unit 101 periodically fetches the key position signals, and compares the values of the key position signals with the previous values in order to determine the key status.

The electronic sound generating system 15*b* further includes a tone generator 106 and a sound system 107. The tone generator 106 includes plural channels. When the central processing unit 101 gives an instruction on the basis a piece of event data representative of the note-on to the tone generator 106, the tone generator assigns generation of the a tone signal to one of the channels. The channel generates the tone signal representative of the tone with the specified pitch and the specified loudness. More than one tone signal may be concurrently generated through the channels. The tone generator 106 produces an audio signal from the tone signal or the tone signals, and supplies the audio signal through an amplifier (not shown) to the sound system 107. The sound system may be implemented by speakers and/or a headphone.

On the other hand, when the central processing unit 101 gives the instruction on the basis of the piece of event data representative of the note-off to the tone generator 106, the channel decays the tone signal, and, accordingly, the sound system 107 decays the tone.

Plural Modes of Operation

As described hereinbefore, the keyboard musical instrument has plural modes of operation. The modes of operation are hereinbelow detailed. The user firstly selects one of the two categories, i.e., an automatic playing mode and an educational mode. The automatic playing system 15*b* plays a tune in the automatic playing mode without fingering on the keys 11*a* to 11*e* and 12*a* to 12*e*. On the other hand, the electric tutor 15*a* assists a trainee in practicing himself in the educational mode. The user can establish the keyboard musical instrument in different modes of operation for the right part and the left part. For example, the user may establish the keyboard musical instrument in the automatic playing mode for the left part and in the educational mode for the right part.

The educational mode is broken down into several sub-modes. The five-finger exercise mode is one of the sub-modes. Other sub-modes are a finger change exercise mode, an any-key mode, a tracing mode and a percussion mode. These sub-modes are hereinbelow further detailed.

Five-finger Exercise Mode

A trainee practices a usage of five fingers along a passage in the five-finger exercise mode. The electric tutor 15*a* selectively energizes the optical indicators 13/14 along the passage for the notice of keys to be depressed. When the trainee depresses the key identical with the key noticed, the tone generating system 15*b* generates the tone. If the trainee depresses a key different from the key to be depressed, the tone generator 106 keeps the sound system 107 silent.

Finger Change Exercise Mode

The trainee practices a sequential usage of fingers in the finger change exercise mode. The electric tutor 15*a* instructs the LED driver 108 to sequentially energize the optical indicators 13/14 along a passage. The energized optical indicator is assumed to be changed in the direction of X in FIG. 1. When the trainee changes the depressed keys in the direction of X, the electronic sound generating system 15*b* generates the tones. However, if the trainee changes the depressed keys in the opposite direction, the tone generator 106 keeps the sound system 107 silent. For example, the LED driver 108 is assumed to energize the optical indicator associated with the key 12*c* and, thereafter, the optical indicator associated with the key 12*a*. The depressed key is changed in the opposite direction. When the player depresses the key 12*c* and, thereafter, the key 12*a* or 12*b*, the electronic sound generating system generates the tones in the passage. The player is assumed to depress the key 12*c* with the middle finger. If the player uses the first finger or the thumb to depress the key on the left side of the depressed key 12*c*, the electronic sound generating system 15*b* generates the tone in the passage.

Any-key Mode

While the keyboard musical instrument is operating in the any-key mode, the trainee is allowed to depress any key or keys, and the electronic sound generating system 15*b* generates the tones along a passage. The electric tutor may exercise the fingers at appropriate timings in the any-key mode. In other words, the trainee may learn the relation between the duration of a tone and a note in the any-key mode. The any-key mode is further available for rehabilitation.

Tracing Mode

The electric tutor 15*a* gives an exhibition of the performance to a trainee in the tracing mode. One of or both of the parts, i.e., the left part and/or the right part selectively enter the tracing mode. The electric tutor 15*a* cooperates with the electronic sound generating system 15*b* in the tracing mode. The central processing unit 101 instructs the key actuators 109 to sequentially move the associated keys 11*a* to 11*e* and/or 12*a* to 12*e* along a passage, and supplies the pieces of tone generation data to the tone generator 106. Thus, the keys 11*a* to 11*e* and 12*a* to 12*e* are depressed and released in synchronism with the tone generation. The trainee traces the sequence of the depressed/released keys. Thus, the trainee leans the fingering for the tune in the tracing mode.

Percussion Mode

As described hereinbefore, several switches are assigned to the percussion mode. A player selectively assigns different kinds of percussion sound to the keys 11*a* to 11*e* and 12*a* to 12*e*. The player may assign a base drum and cymbals to the thumb of the right hand and the first finger of the same hand. The player is assumed to depress the key 12*a* and, thereafter, the key 12*b*. The associated key sensors 110 detects the variation of the motion of the key 12*a* and, thereafter, the motion of the key 12*b*, and informs the central processing unit 101 of the key motions. Then, the central processing unit 101 instructs the tone generator 106 to generate the sound of the base drum and, thereafter, the sound of the cymbals. However, the central processing unit 101 does not instruct the LED driver to energize the optical indicators 13/14. Thus, the trainee learns rhythms through the percussion mode.

Flags and Registers

The start flag SF is indicative of whether the keyboard musical instrument is active or inactive. When a player depresses the start switch, the start flag SF is set to logic "1" level. On the other hand, when the player depresses the stop switch, the start flag SF is reset to logic "0" level.

The part flag PF is indicative of whether the left part and the right part are in the automatic playing mode or the educational mode. When the right part and the left part are respectively established in the educational mode and in the automatic playing mode, value "0" is given to the part flag PF. On the other hand, if the player establishes the left part and the right part in the educational mode and in the automatic playing mode, respectively, the part flag PF is changed to value "1". When the player establishes both parts in the educational mode, the central processing unit 101 writes value "2" in the part flag PF.

When one of or both of the left/right parts are established in the educational mode, the educational mode flags PM(R) or/and PM(L) are valid, and are indicative of the selected sub-mode. Values "0", "1", "2", "3" and "4" are representative of the five-finger exercise mode, the finger change mode, the any-key mode, the tracing mode and the percussion mode, respectively. When value "0" is stored in the flag PM(R), the right part is operating in the five finger exercise mode. If the flag PM(L) has value "4", the left part is operative in the percussion mode.

The time intervals between the tone generation events are stored in the registers DU(R) and DU(L), and the registers DUG(R) and DUG(L) are assigned the time intervals between the pieces of event data representative of the key pressure.

The time interval stored in the register DU(R) is indicative of the lapse of time between the tone generation events for the right part, and the time interval stored in the register DU(L) is indicative of the lapse of time between the tone generation events for the left part. A player is assumed to practice the fingering for the tune shown in FIGS. 3A and 3B. When the player starts to practice the fingering, the central processing unit 101 stores value "10", i.e., 4+6 in the register DU(R) and value "18", i.e., 12+6 in the register DU(L), respectively. The central processing unit 101 changes the pieces of duration data in the registers DU(R) and DU(L) to value "12" upon read-out from the address R4 and, thereafter, to "8+6=14" upon read-out from the address R6. On the other hand, the central processing unit 101 firstly stores value "4" in the register DUG(R), and changes the value to "6+12+8=26" upon readout from the address R2.

Similarly, the central processing unit 101 firstly stores value "12+6=18" in the register DU(L) and value "12" in the register DUG(L), and changes the values to "32" upon read-out from the address L3 and to "6+32+2=40" upon read-out from address L2.

The registers AD(R) and AD(L) are assigned to the address locations where the tone generation events are stored. For example, the address R4 is firstly stored in the register AD(R), and the content of the register AD(R) is stepwise changed to R6, R10, R12, . . . . When the time period stored in the register DU(R) is expired, the central processing unit reads out the address from the register AD(R). Similarly, the address L4 is firstly stored in the register AD(L), and the address in the register AD(L) is stepwise changed to L6, L10, L12, . The central processing unit 101 reads out the address from the register AD(L) as similar to the address stored in the register AD(R).

The registers ADG(R) and ADG(L) are assigned the address where the pieces of event data representative of the key pressure are stored. The address R2 is firstly stored in the register ADG(R), and the address in the register ADG(R) is stepwise changed to R8 . . . . When the time period stored in the register DUG(R) is expired, the central processing unit 101 reads out the address from the register AD(R). Similarly, the address L2 is firstly stored in the register ADG(L), and the address in the register AD(L) is stepwise changed to L8, . . . . The central processing unit 101 reads out the address from the register ADG(L) as similar to the address stored in the register ADG(R).

Computer Programs

As described hereinbefore, various computer programs are stored in the read only memory 102, and the central processing unit 101 runs on those computer programs. The computer programs are hereinbelow detailed.

Main Routine Program & Timer Interruption

Figure 4:
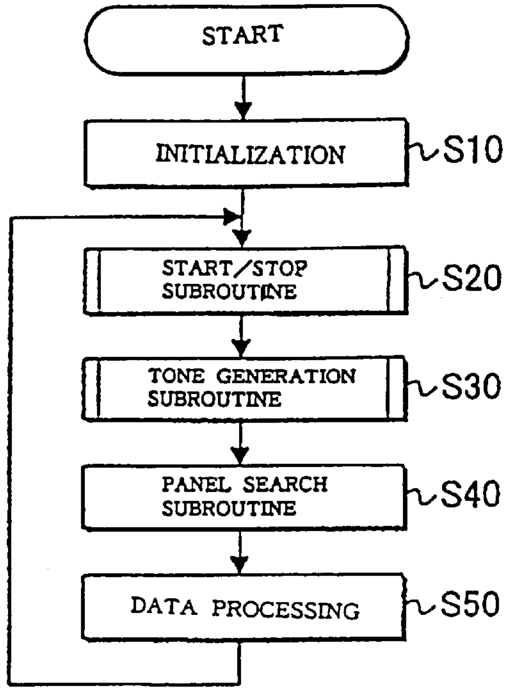
FIG. 4 is a flowchart showing a main routine program for the controller.

FIG. 4 illustrates a main routine program. When the keyboard musical instrument is powered, the central processing unit 101 starts the main routine program shown in FIG. 4, and the main routine program periodically branches to a timer interruption subroutine program shown in FIG. 5. The timer interruption takes place at intervals proportional to selected tempo. In detail, the central processing unit 101 initializes the flags and registers at step S10, and checks the manipulating panel 105 to see whether or not a trainee manipulates the start/stop keys. If the trainee depressed the start/stop keys, in the main routine program branches into a start/stop subroutine S20, and the central processing unit 101 sequentially executes the instructions shown in FIG. 6.

Figure 7:
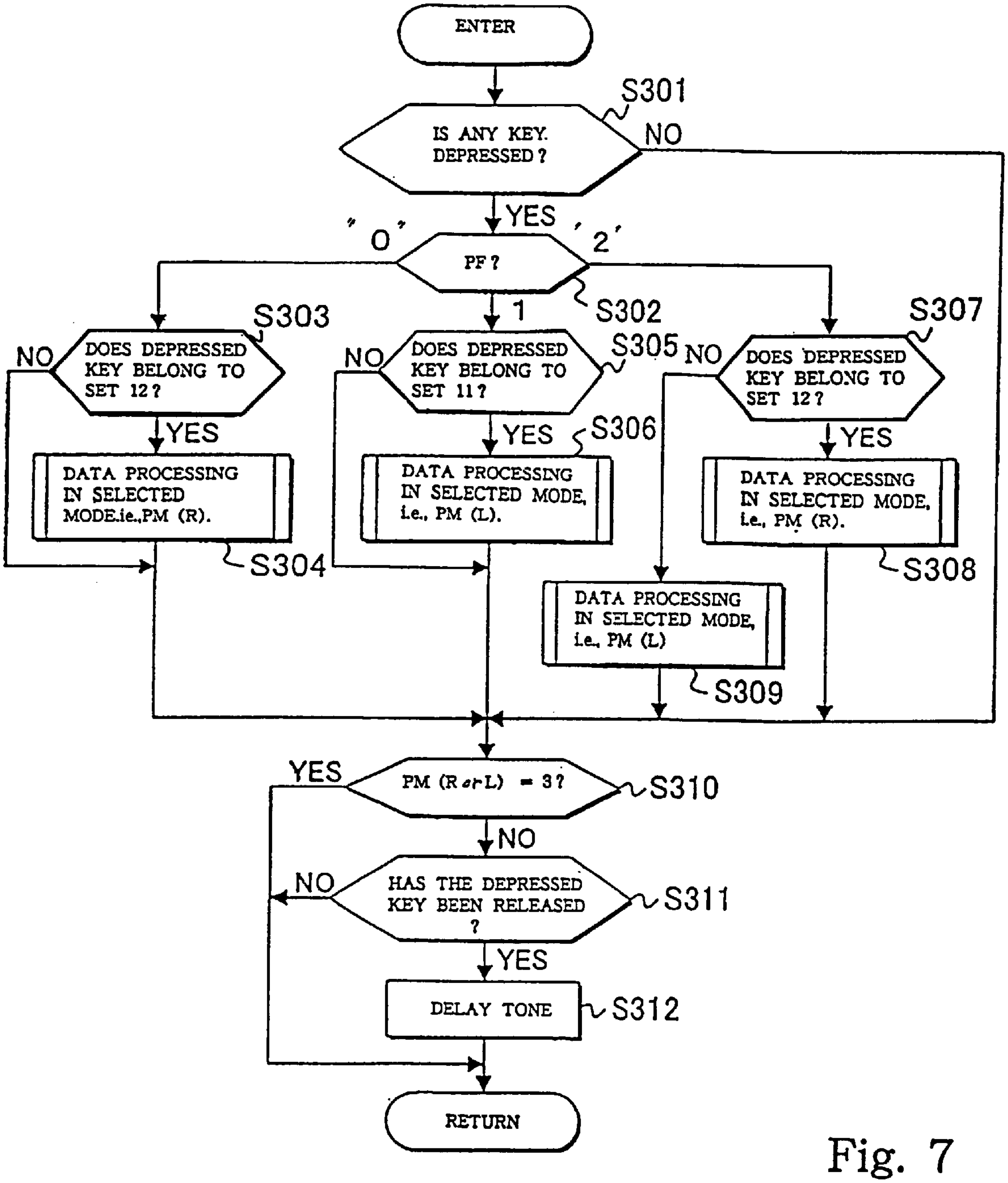
FIG. 7 is a flowchart showing a tone generation subroutine program.

If the trainee did not depress the start/stop keys or if the central processing unit 101 returns from the start/stop subroutine S20, the main routine program branches into a tone generation subroutine S30, and the central processing unit 101 executes instructions of the program sequence shown in FIG. 7. The central processing unit 101 generates tones and decays the tones through the tone generation subroutine S30. When the player depresses any one of the keys 11*a* to 11*e* and 12*a* to 12*e*, the central processing unit 101 instructs the tone generator 106 generates the tone or sound. On the other hand, when the player releases the depressed key, the central processing unit 101 instructs the tone generator 106 to decay the tone or sound.

Upon completion of the data processing at step S30, the central processing unit proceeds to step S40, and the main routine branches to a panel search subroutine. In the panel search subroutine, the central processing unit 101 checks the manipulating panel 105 to see whether or not the player manipulates any one of the switches or dials. When the switch or dial is changed, the central processing unit 101 sets or resets the flags. The central processing unit 101 carries out a data processing for other items at step S50, and returns to step S20. Thus, the central processing unit reiterates the loop consisting of steps S20, S30, S40 and S50 until the power is removed from the keyboard musical instrument.

While the central processing unit 101 is reiterating the loop, the timer interruption takes place at predetermined time intervals, and the main routine program branches to the timer interruption subroutine. In the timer interruption subroutine, the central processing unit 101 carries out the data processing for the part or parts established in the automatic playing mode and instructs the LED driver to irradiate the light from the optical indicators 13/14.

Start/stop Subroutine

Figure 6:
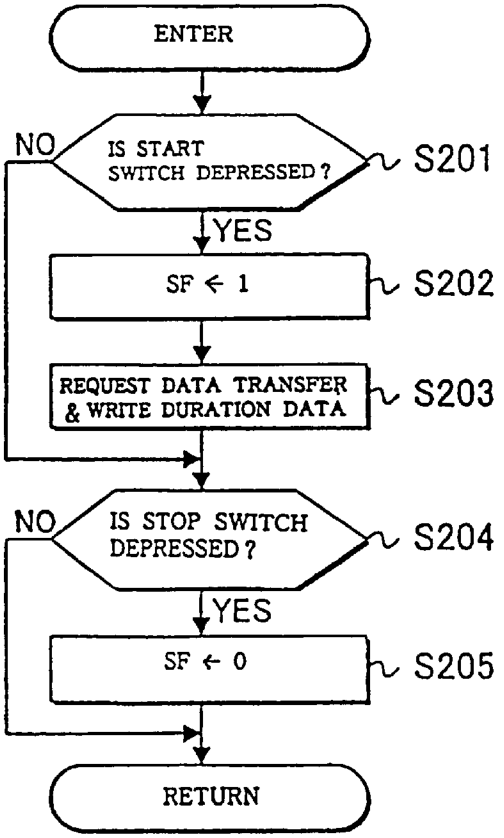
FIG. 6 is a flowchart showing a start/stop subroutine program.

FIG. 6 illustrates a sequence of instructions for the start/stop subroutine program. When the main routine program branches to the start/stop subroutine program, the central processing unit 101 firstly checks the manipulating panel 105 to see whether or not the player has depressed the start switch as by step S201. If the player has already depressed the start switch, the answer at step S201 is given affirmative, and the central processing unit 101 changes the start flag SF to logic "1" level as by step S202.

Subsequently, the central processing unit 101 requests the external memory 104 to transfer pieces of music data to the area in the random access memory 103 assigned thereto, and writes the first piece of duration data in each of the registers DU(R), DU(L), DUG(R) and DUG(L) as by step S203. If the pieces of music data transferred from the external memory 104 are identical with those shown in FIGS. 3A and 3B, the first piece of duration data to be written are value "10", value "18", value "4" and value "12" to the registers DU(R), DU(L), DUG(R) and DUG(L), respectively.

If the player has not depressed the start switch, yet, the answer at step S201 is given negative, and the central processing unit 101 proceeds to step S204. When the central processing unit 101 completes the job at step S203, the central processing unit 101 proceeds to step S204. The central processing unit 101 checks the manipulating panel 105 to see whether or not the player has depressed the stop switch at step S204. If the player has depressed the stop switch, the answer at step S204 is given affirmative, and the central processing unit 101 changes the start flag SF to logic "0" level as by step S205. Upon completion of the job at step S205, the central processing unit 101 returns to the main routine program. If the answer at step S204 is given negative, the central processing unit 101 immediately returns to the main routine program.

Timer Interruption Subroutine & Tone Generation Subroutine

Figure 5:
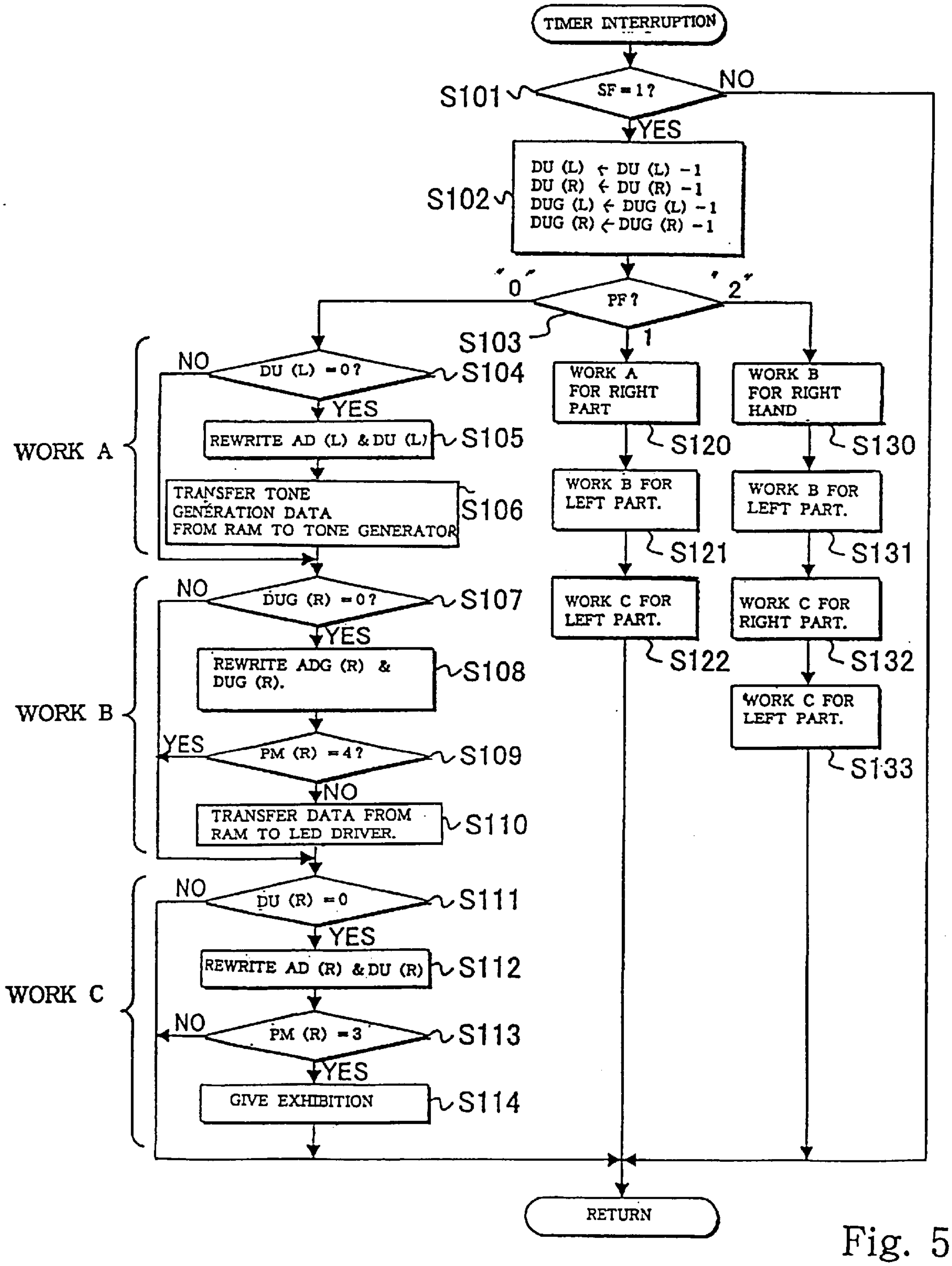
FIG. 5 is a flowchart showing a timer interruption subroutine program.

FIG. 5 shows the timer interruption subroutine, and FIGS. 7 and 8A to 8E illustrate the tone generation subroutine. In the following description, the player is assumed to select the automatic playing mode for the left part and the educational mode for the right part, respectively. The description on the right part will branch to the five finger exercise mode, the finger change exercise mode, the any-key mode, the tracing mode and the percussion mode. The player is assumed to select the five finger exercise mode for the right part. The part flag PF and the educational mode flag PM(R) are set to value "0". When the timer interruption takes place, the main routine program branches to the timer interruption subroutine program shown in FIG. 5. The central processing unit 101 firstly checks the start flag SF to see whether or not the player has already requested the controller 15 for the automatic playing and/or the guide in practicing the fingering as by step S101. If the player has not depressed the start key, the start flag SF is in logic "0" level, and the answer at step S101 is given negative. With the negative answer, the central processing unit 101 immediately returns to the main routine program.

On the other hand, if the player has already depressed the start switch, the start flag SF is set to logic "1" level, and the answer at step S101 is given affirmative. Then, the central processing unit 101 decrements the value of the pieces of duration data stored in the registers DU(L), DU(R), DUG(L) and DUG(R) as by step S102.

Subsequently, the central processing unit 101 checks the part flag PF to see whether each of the left/right parts is established in the automatic playing mode or the educational mode as by step S103. As described hereinbefore, the part flag PF has value "0", value "1" or value "2" depending upon the selected mode of operation. The player has established the left part and the right part in the automatic playing mode and in the educational mode, respectively. In this situation, value "0" is stored in the part flag PF. Then, the central processing unit 101 proceeds to step S104, and sequentially carries out jobs at steps S104, S105 and S106, jobs at steps S107, S108, S109 and S110 and jobs at steps S111, S112, S113 and S114. The jobs at steps S104 to S106, the jobs at steps S107 to S110 and the jobs at steps S111 to S114 are hereinbelow referred to as "work A", "work B" and "work C", respectively.

In detail, the central processing unit 101 checks the register DU(L) to see whether or not the time interval to the next key pressure expires as by step S104. If the key pressure is in future, the value stored in the register DU(L) has reached to zero, and the answer at step S104 is given negative. Then, the central processing unit 101 proceeds to step S107 without the jobs at steps S105 and S106. On the other hand, if the registered time interval has expired, zero is stored in the register DU(L), and the answer at step S104 is given affirmative. Then, the central processing unit 101 rewrites the register AD(L) to the address where a piece of tone generation data to be transferred is stored, and stores a time interval to the next piece of tone generation data in the register DL(L) as by step S105. When the central processing unit 101 executes step S105 for the first time, the central processing unit 101 writes the address assigned to the first piece of tone generation data and the time interval to the next piece of tone generation data in the register AD(L) and the register DU(L) at step S115. Subsequently, the central processing unit accesses the address stored in the register AD(L), and transfers the piece of tone generation data to the tone generator 106. The tone generator 106 produces the tone signal from the piece of tone generation data representative of the note-on, and supplies the audio signal to the sound system 107. If the piece of tone generation data represents the note-off, the tone generator 106 decays the tone signal. In this way, the automatic playing system 15*b* sequentially produces the tones in the left part on the basis of the pieces of music data shown in figure 3B.

Upon completion of the job at step S106 or with the negative answer at step S104, the central processing unit 101 proceeds to step S107. The central processing unit 101 checks the register DUG(R) to see whether or not the time interval expires at step S107. If the value stores therein is greater than zero, it is not time to give a notice of fingering, and the answer at step S107 is given negative. Then, the central processing unit 101 proceeds to step Sill without execution at steps S108 to S110.

On the other hand, If zero is stored in the register DUG(R), it is the time to energize the optical indicator, and the answer at step S107 is given affirmative. Then, the central processing unit 101 rewrites the address assigned to a piece of event data representative of a key pressure to be carried out and the time interval to the key pressure in the register ADG(R) and the register DUG(R), respectively, at step S108. Subsequently, the central processing unit 101 checks the random access memory 103 to see whether or not the educational mode flag PM(R) has value 4 is stored therein at step S109. Value "4" has been stored in the educational mode flag PM(R). The answer at step S109 is given negative. Then, the central processing unit 101 accesses the address stored in the register ADG(R), and transfers the piece of even data representative of the key pressure to the LED driver 108 at step S110. The LED driver 108 specifies the optical indicator 13/14, and energizes the selected optical indicator 13/14. When a predetermined time period expires, the LED driver 108 extinguishes the optical indicator 13/14. The electric tutor 15*a* gives the player the notice that time comes when he has to depress the key 11*a* to 11*e* and 12*a* to 12*e*. Thus, the electric tutor 15*a* guides the player in the practice of fingering through the optical indicators 13/14 in the educational mode except the percussion sub-mode.

Upon completion of the job at step S110, the central processing unit 101 proceeds to step S111. When the answer at step S107 is given negative or the answer at step S109 is given affirmative, the central processing unit 101 also proceeds to step S111. The central processing unit 101 checks the register DU(R) to see whether or not it is time to generate a tone. If the stored value is greater than zero, time will come in future, and the answer at step S111 is given negative. Then, the central processing unit 101 returns to the main routine program. On the other hand, when the stored value reaches zero, it is time to generate a tone, and the answer at step S111 is given affirmative. Then, the central processing unit 101 rewrites the address assigned to a piece of tone generation data stored in the register AD(R) to be read out and the time interval stored in the register DU(R) as by step S112. When the central processing unit 101 executes the instructions at step S112 for the first time, the central processing unit writes the address assigned to the first piece of tone generation data representative of the note-on in the register AD(R), and stores the time interval to the next piece of tone generation data in the other register DU(R).

Subsequently, the central processing unit 101 checks the educational mode flag PM(R) to see whether or not the player assigns the tracing mode to the right part as by step S113. If the educational mode flag PM(R) stores value "3", the player has selected the tracing mode, value "3" is stored in the educational mode flag PM(R), and the answer at step S113 is given affirmative. With the affirmative answer, the central processing unit 101 proceeds to step S114, and gives an exhibition to the trainee as will be hereinlater described in detail. However, the five finger mode was selected for the right part. In this situation, the answer at step S113 is given negative, and the central processing unit 101 returns to the main routine program.

As described hereinbefore, when the central processing unit 101 achieves the jobs in the start/stop subroutine program, the central processing unit 101 returns to the main routine program, and the main routine program immediately branches to the tone generation subroutine S30. In the tone generation subroutine S30, the central processing unit 101 firstly checks the pieces of control data representative of status of the keys to see whether or not the player depresses any one of the keys 11*a* to 11*e* and 12*a* to 12*e* as by step S301. If the player keeps all of the keys 11*a* to 11*e*/12*a* to 12*e* in the previous status, the answer at step S301 is given negative, and the central processing unit 101 proceeds to step S310. On the other hand, if the central processing unit 101 finds a newly depressed key, the answer at step S301 is given affirmative, and the central processing unit 101 checks the part flag PF to see whether the stored value is zero, 1 or 2 as by step S302. Value "0" was stored in the part flag PF, and the central processing unit 101 proceeds to step S303.

The central processing unit 101 checks the key position signal to see whether or not the key was depressed by a finger of the right hand. If the player depressed the key by a finger of the left hand, the answer at step S303 is given negative, and the central processing unit 101 proceeds to step S310. When the player depressed the key by a finger of the left hand, the answer at step S303 is given affirmative, and the central processing unit 101 carries out data processing for the selected educational mode as by step S304.

Figure 8A:
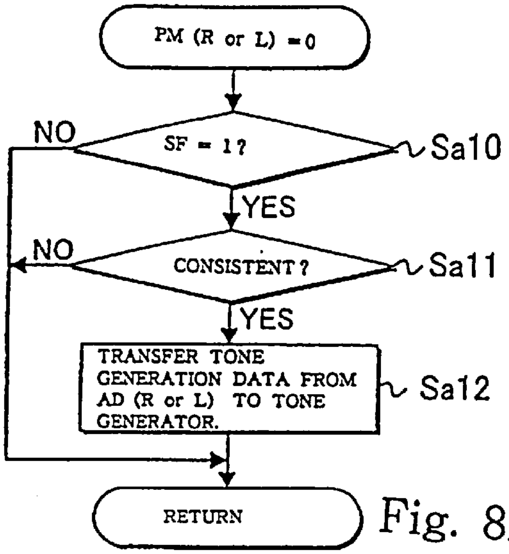
FIGS. 8A to 8E are flowcharts showing parts of the tone generation subroutine program.
Figure 8B:
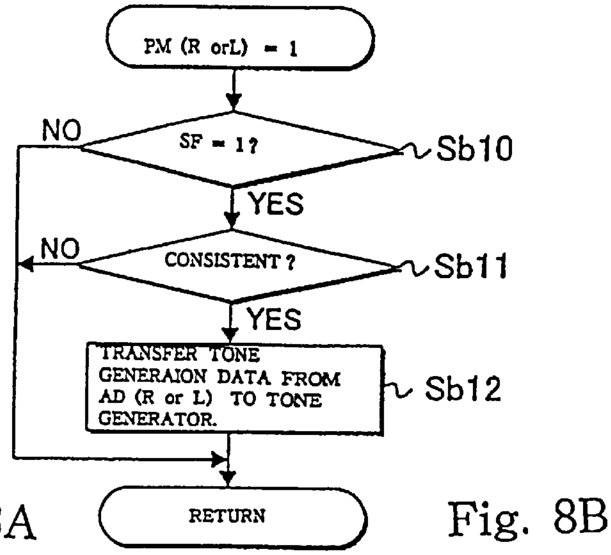

The player has selected the five finger exercise mode, and, accordingly, the central processing unit 101 carries out the data processing for the five finger exercise mode as shown in FIG. 8A. In the data processing for the five finger exercise mode, the central processing unit 101 checks the random access memory 103 to see whether or not the start/stop flag SF has value "1" as by step Sa10. If the player has not depressed the start switch, yet, the answer at step Sa10 is given negative, and the central processing unit 101 proceeds to step S310. On the other hand, when the player depressed the start switch, the answer at step Sa10 is given affirmative, and the central processing unit 101 checks the register ADG(R) to see whether or not the depressed key has a note number consistent with the note number assigned to the key represented by the piece of event data stored at the address stored in the register ADG(R) as by step Sa11. If the depressed key is different from the key to be depressed, the answer at step Sa11 is given negative, and the central processing unit 101 immediately proceeds to step S310 without any tone generation. On the other hand, when the depressed key is consistent with the key to be depressed, the answer at step Sa11 is given affirmative, and the central processing unit 101 reads out the piece of tone generation data from the register AD(R), and transfers the piece of tone generation data to the tone generator 106. Thereafter, the central processing unit 101 proceeds to step S310. The tone generator produces the tone signal from the piece of tone generation data, and supplies the audio signal to the sound system 107. Then, the tone is radiated from the sound system 107. Thus, the electric tutor 15*a* generates the tone only when the player depresses the key specified by the optical indicator 13/14 in the five finger exercise mode.

The electric tutor 15*a* may alarm the player of an error in fingering. As shown in FIGS. 3A and 3B, the piece of event data representative of the key pressure is read out earlier than the piece of event data representative of the note-on. For example, the key pressure is read out from address R2 earlier than the note-on stored at address R4 by the time period "6". If the player depresses the key between the write-in of a piece of event data representative of the key pressure and the write-in of the piece of even data representative of the associated note-on, the electric tutor 15*a* may store the next piece of tone generation event in the register AD(R) or AD(L) so as to generate a tone different from the tone to be produced. Otherwise, the electric tutor 15*a* may keep the sound system 107 silent. In order to make the decision at step Sa11 and step Sb11 which will be hereinlater described, the central processing unit 101 may transfer the piece of event data representative of the previous key pressure from the register ADG(R) to a predetermined data area in the random access memory immediately before the write-in of the pieces of event/duration data into the registers ADG(R) and DUG(R) at step S108 so as to compare the depressed key with the key to be depressed.

Turning back to FIG. 7, when the central processing unit proceeds to step S310, it makes a decision on the decay of the tone through steps S130 to S312. The central processing unit 101 checks the random access memory 103 to see whether or not value "3" is stored in the educational mode flag PM(R) or PM(L) at step S310. If the electric tutor 15*a* is established in the tracing mode, the educational mode flag has stored value "3", and the answer is given affirmative. Then, the central processing unit 101 returns to the main routine program. The educational mode flag PM(R or L) has stored value "0" on the above-described assumption. The answer at step S310 is given negative, and the central processing unit 101 checks the pieces of control data representative of status of the keys to see whether or not the player has released the depressed key at step S311. If the player keeps the key depressed, the central processing unit 101 returns to the main routine program without execution of step S312. On the other hand, when the central processing unit 101 acknowledges that the player has released the key, the central processing unit 101 instructs the tone generator 106 to decay the tone.

Subsequently, description is made on the assumption that the left part and the right part are established in the automatic playing mode and the finger change exercise mode. Value "0" and value "1" are stored in the part flag PF and the educational mode flag PM(R), respectively. In this situation, the electric tutor 15*a* behaves as similar to the above description except parts of the tone generation subroutine program. For this reason, description is focused on the different steps in the tone generation subroutine program. The central processing unit 101 achieves jobs shown in FIG. 8B at step S304. Firstly, the central processing unit 101 checks the random access memory 103 to see whether or not the player has already instructed the electric tutor 15*b* to start the guide as by step Sb10. If value "0" is stored in the start/stop flag SF, the player has not instructed the guide, yet, and the central processing unit 101 proceeds to step S310 with the negative answer. When the player instructed the electric tutor 15*a* to start, value "1" is stored in the start/stop flag SF, and the answer at step Sb10 is given affirmative. Then, the central processing unit 101 checks the random access memory 103 for the key pressure events. The address assigned to the piece of event data representative of the key pressure presently given to the player is stored in the register ADG(R), and the key pressure previously given to the player is stored in the random access memory 103 as a piece of event data. The central processing unit 101 determines which direction the player has to change the key 12*a*–12*e*. The central processing unit 101 further checks the data area for the presently depressed key and the key previously depressed by the player. Then, the central processing unit 101 determines the direction in which the player actually changes the keys 12*a*–12*e*. Comparing the direction already instructed with the actual direction, the central processing unit 101 decides whether or not the player changes the key in the correct direction at step Sb11. If the player changes the key 12*a*–12*e* in the different direction, the central processing unit 101 proceeds to step S310 without any tone generation. On the other hand, when the player correctly changes the keys, the answer at step Sb11 is given affirmative, and the central processing unit 101 transfers the piece of tone generation data from the address stored in the register AD(R) to the tone generator 106. Thereafter, the central processing unit 101 proceeds to step S310. The tone generator produces the tone signal from the piece of tone generation data, and supplies the audio signal to the sound system 107. The sound system radiates the tone.

Thus, when the electric tutor 15*a* is established in the finger change exercise mode, the electronic sound generating system 15*b* generates the tone under the conditions that the direction to change the keys is consistent with the actual direction, and the player exercises the fingers in the passage. For example, if the piece of event data are indicative of the key 12_d_ to be depressed with the ring finger and the key 12_b_ was previously depressed, the key 12_d_ is on the right side of the previously depressed key 12_b_. In this situation, when the player depresses any one of the keys 12_c_/12_d_/12_e_, the electric tutor 15_a_ requests the electronic sound generating system 15_b_ to generate the tone. However, if the player depresses the key 12_a_ or 12_b_, the electronic sound generating system 12_b_ keeps the sound system 107 silent.

Description is continued on the assumption that the player establishes the left part and the right part in the automatic playing mode and the any-key mode, respectively. Value "0" and value "2" are stored in the part flag PF and the educational mode flag PM(R), respectively. The electric tutor 15_a_ behaves in the any-key mode as similar to that in the five finger mode except jobs at step S304. For this reason, description is focused on the jobs at step S304.

Figure 8C:
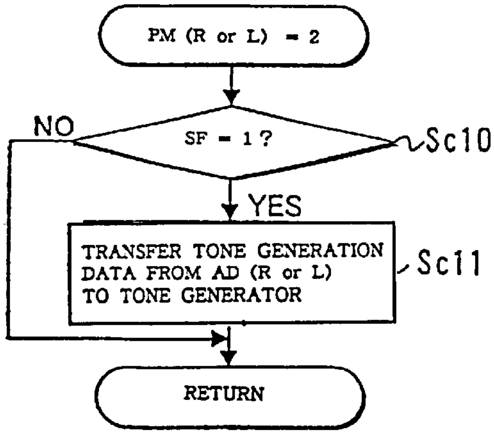

The jobs at step S304 is shown in FIG. 8C. The central processing unit 101 checks the start/stop flag SF to see whether or not the player has depressed the start switch as by step Sc10. If the player has not depressed the start switch, yet, the central processing unit 101 immediately proceeds to step S310. If the player has instructed the electric tutor 15_a_ to start the guide, the answer at step Sc10 is given affirmative, and the central processing unit 101 transfers the piece of tone generation data from the address stored in the register AD(R) to the tone generator 106. Thereafter, the central processing unit 101 proceeds to step S310. The tone generator 106 produces the tone signal from the piece of tone generation data, and supplies the audio signal to the sound system 107. The sound system 107 radiates the tone. Thus, when the player depresses any one of the keys 12_a_ to 12_e_, the electric tutor 15_a_ requests the electronic sound generating system 15_b_ to generate the tone. Description is continued on the assumption that the player establishes the left part and the right part in the automatic playing mode and the tracing mode. Value "0" and value "3" are stored in the part flag PF and the educational mode flag PM(R), respectively.

While the central processing unit 101 is running on the timer interruption subroutine program, the answer at step S113 is given affirmative. Then, the central processing unit 101 reads out the piece of tone generation data from the address stored in the register AD(R) and the piece of event data representative of the key pressure from the address stored in the ADG(R), and transfers the piece of tone generation data to the tone generator 106 and the key actuators 109 and the piece of event data to the key actuators 109 at step S114. The tone generator 106 produces the tone signal from the piece of tone generation data, and supplies the audio signal to the sound system 107. If the piece of tone generation data is representative of the note-on, the key actuator 109 specifies a key on the basis of the piece of event data representative of the key pressure, and sinks the associated key. On the other hand, if the piece of tone generation data is representative of the note-off, the electric power is removed from the key actuator 109, and the depressed key is released. Thus, the electric tutor 15_a_ cooperates with the electronic sound generating system 15_b_, and gives an exhibition to the player.

Figure 8D:
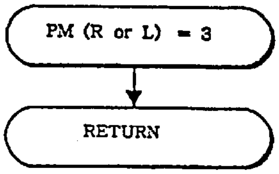

Thus, the exhibition is achieved through the timer interruption subroutine program, and the central processing unit 101 proceeds to from step S304 to step S310 without any job as shown in FIG. 8D. The central processing unit 1011 checks the random access memory 103 whether or not the educational mode flag PM(R) has value "3" at step S310. The answer is given affirmative, and the central processing unit 101 immediately returns to the main routine program. This is because of the fact that the electric tutor 15_a_ decays the tone at step S114 in the tracing mode.

Subsequently, the player is assumed to establish the left part and the right part in the automatic playing mode and the percussion mode, respectively. Value "0" and "4" are stored in the part flag PF and the educational mode flag PM(R), respectively. When the central processing unit 101 checks the educational mode flag PM(R) in the timer interruption subroutine program, the answer at step S109 is given affirmative, and the central processing unit 101 proceeds to step S111 without transferring the key pressure to the LED driver 108. For this reason, the electric tutor 15_a_ does not guide the player through the optical indicators 13/14. Upon completion of the jobs at steps 111 and 112, the central processing unit 101 returns to the main routine program.

Figure 8E:
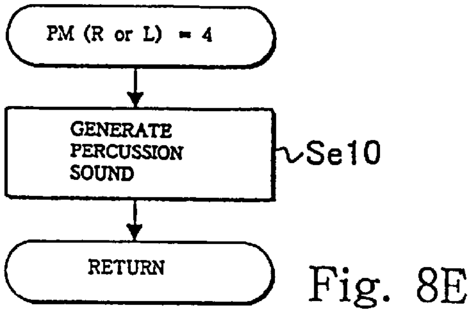

The jobs at step S304 is shown in FIG. 8E. When the central processing unit 101 acknowledges that the player depresses any one of the keys 12_a_ to 12_e_, the central processing unit 101 determines the percussion sound to be produced, and instructs the tone generator 106 to produce a sound signal representative of the percussion sound as by step Se10. The tone generator 106 supplies the audio signal to the sound system 107, and the sound system 107 radiates the percussion sound. Upon completion of the jobs at step Se10, the central processing unit 101 proceeds to step S310.

If the player establishes the right part and the left part in the automatic playing mode and in the educational mode, respectively, the electric tutor behaves as follows. Value "1" is stored in the part flag PF. In this situation, when the central processing unit 101 checks the part flag PF, the central processing unit 101 decides to proceed to step S120. The electric tutor 15_a_ achieves the work A for the right part at step S120. If "L" is read as "R", the jobs at steps S104 to S106 constitute the work A for the right part. Subsequently, the central processing unit 101 achieves the work B for the left part at step S121 and the work C for the left part at step S122. If "L" is read as "R", the jobs at steps S107 to S110 and jobs at steps S111 to S114 constitute the work B at step S121 and work C at step S122, respectively. When the main routine program branches to the tone generation subroutine program, the electric tutor 15_a_ steers the program sequence to step S305 at step S302. The central processing unit 101 checks the pieces of control data representative of the status of the keys to see whether the depressed key belongs to the set 11 at step S305. If the depressed key belongs to the other set 12, the central processing unit 101 proceeds to step S310. On the other hand, when the player depressed one of the keys 11_a_ to 11_e_, the depressed key belongs to the left set 11, and the answer at step S305 is given affirmative. Then, the central processing unit 101 checks the educational mode flag PM(L) to see what mode the player established the electric tutor 15_a_ in, and achieves the jobs shown in one of the FIGS. 8A to 8E for the left part at step S306. Upon completion of the jobs at step S306, the central processing unit 101 checks the random access memory 103 to see whether or not value "3" is stored in the educational mode flag PM(L). If the answer at step S310 is given affirmative, the central processing unit 101 immediately returns to the main routine program. On the other hand, if the player has established the electric tutor 15_a_ in any one of the modes except the tracing mode, the educational mode flag PM(L) has value "0", "2" or "4", and the answer at step S310 is given negative. Then, the central processing unit 101 checks the random access memory 103 to see whether or not the player releases the depressed key as by step S311. If the player is still depressing the key, the answer at step S311 is given negative, and the central processing unit 101 returns to the main routine program. On the other hand, if the pieces of control data representative of the status of keys indicate that the player releases the depressed key, the answer at step S311 is given affirmative, and the central processing unit 101 instructs the tone generator 106 to decay the tone signal at step S312. The sound system 107 decays the tone or the sound. The central processing unit 101 returns to the main routine program.

Assuming now that the player establishes both parts in the educational mode, value "2" is stored in the part flag PF. When the central processing unit 101 reaches step S103, the central processing unit 101 checks the part flag PF, and steers the program sequence to step S130. The central processing unit 101 achieves the work B for the right part at step S130, the work B for the left part at step S131, the work C for the right part at step S132 and the work C for the left part at step S133. Thus the electric tutor 15*a* guides the player in practicing the fingering on both parts through the jobs at steps 130 and 131. Moreover, the electric tutor 15*a* writes addresses into the registers AD(R and L)/DU(R and L), and cooperates with the electronic sound generating system 15*b* for an exhibition. Upon completion of the jobs, the central processing unit 101 returns to the main routine program.

When the main routine program branches to the tone generation subroutine program, the central processing unit 101 executes the instructions at step S301, and proceeds to step S302. The part flag PF is indicative of that both parts are in the educational mode. Then, the central processing unit 101 proceeds to step S307. The central processing unit 101 checks the pieces of control data representative of the status of keys to see whether or not the depressed key belongs to the set 12 at step S307. If the depressed key belongs to the set 12, the answer at step S307 is given affirmative, and the central processing unit 101 achieves the jobs shown in one of FIGS. 8A to 8E for the right part as by step S308. On the other hand, If the depressed key belongs to the set 11, the answer at step S307 is given negative, and the central processing unit 101 achieves the jobs shown in one of FIGS. 8A to 8E for the left part as by step S309. When the central processing unit 101 completes the jobs for either left or right part, the central processing unit proceeds to step S310, and instructs the tone generator 106 to continue or stop the tone generation as described hereinbefore.

As will be understood from the foregoing description, the keys 11*a* to 11*e* and 12*a* to 12*b* are assigned to the ten fingers, respectively, and the electric tutor 15*a* guides a player or a trainee in practicing the fingering on the keys 11*a* to 11*e* and 12*a* to 12*e* through the sequential radiation of light from the optical indicators 13/14. The trainee is only expected to selectively depress the keys with the associated fingers. Any position change is not required for the passage. For this reason, the trainee or a physically handicapped person can perform a tune on the keyboard musical instrument according to the present invention. Moreover, the trainee concentrates his attention on the ten fingers, and practices smooth fingering on the keys 11*a* to 11*e* and 12*a* to 12*e*. When the trainee masters the smooth fingering on the keyboard musical instrument according to the present invention, he may take an advanced course on the acoustic piano or the like.

The electric tutor 15*a* selectively radiates the light from the optical indicators 13/14 so as to guide the trainee in practicing the fingering. The keys 11*a* to 11*e*/12*a* to 12*e* are respectively assigned the ten fingers, and any additional instruction for specifying the finger to be used is not required. In other words, the electric tutor 15*a* according to the present invention specifies the finger to use as well as the key to be depressed through the optical indicators 13/14. This results in the simple electric tutor.

The electric tutor 15*a* has the plural educational modes of operation. The electric tutor guides the trainee in mastering the skills for the fingering. The trainee may exercise the fingers in the tracing mode, then in the any-key mode, then in the finger change exercise mode and finally in the five finger exercise mode.

The trainee is allowed to independently establish the right/left parts in the educational mode. The trainee can improve the skills in the fingering for the right part and the left part, separately. In other words, the electric tutor 15*a* allows the trainee to concentrate his attention on either left or right part. This feature is convenient to the trainee. A player may separately establish the left/right parts in the percussion mode and in the five-finger exercise mode. The player enjoys the ensemble through the keyboard musical instrument according to the present invention.

Finally, the keyboard musical instrument has only ten keys. This feature improves the portability of the keyboard musical instrument.

Second Embodiment

As described hereinbefore, the keyboard musical instrument implementing the first embodiment has the five finger exercise mode, the finger change exercise mode, the any-key mode, the tracing mode and the percussion mode. A keyboard musical instrument implementing the second embodiment also has five educational modes. The five educational modes are referred to as "consistent key mode", "consistent key change mode", "any-key mode", "tracing mode" and "percussion mode". However, the five educational modes are different from those of the first embodiment as will be understood.

Figure 9:
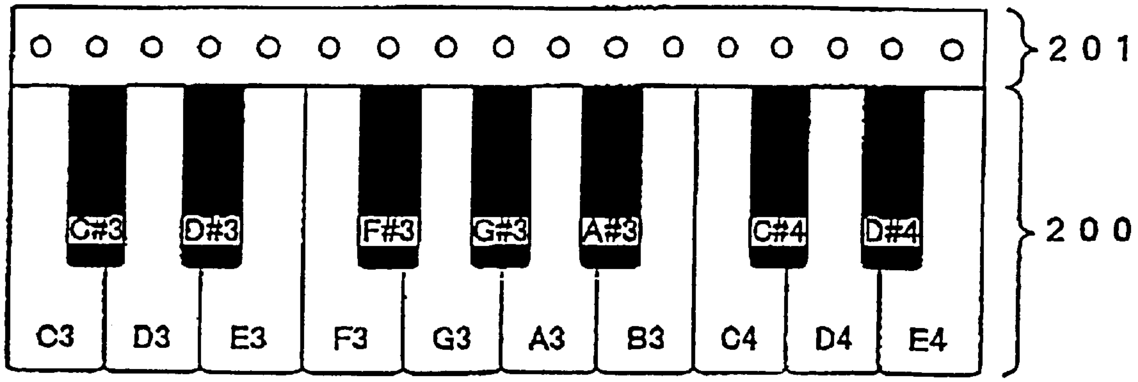
FIG. 9 is a plane view showing another keyboard musical instrument according to the present invention.

FIG. 9 illustrates another keyboard musical instrument implementing the second embodiment. The keyboard musical instrument comprises a keyboard 200, optical indicators 202 and a controller (not shown). The controller is similar in circuit configuration to the controller 15. For this reason, circuit components are labeled with the references designating corresponding circuit components of the controller 15 in the following description.

The keyboard 200 has plural white keys . . . C3/D3/E3/F3/G3/A3/B3/C4/D4/E4/ . . . and black keys . . . C#3/D#3/F#3/G#3/A#3/C#4/D#4/ . . . Although the seventeen keys are shown in FIG. 9, eighty-eight keys are incorporated in the keyboard 200, and are laid on the pattern of the keyboard of the acoustic piano. Pitch names . . . C3, C#3, D3, . . . , D4, D#4, E4 . . . are respectively assigned to the white/black keys. Unspecified black/white key is hereinbelow designated by reference numeral 200, and specific black/white key is labeled with the pitch name in the following description. When a player depresses any one of the keys 200, the keyboard musical instrument generates a tone with the pitch name identical with that of the depressed key 200.

The eighty-eight black/white keys 200 are respectively associated with the optical indicators 201, and the eighty-eight optical indicators 201 are located in the vicinity of the black/white keys 200. The LED driver 108 is connected to the optical indicators 201, and selectively energizes them. When the electric tutor 15*a* starts a trainee in practice of fingering, the LED driver 108 sequentially energizes the optical indicators 201 along a passage. If the trainee depresses the black/white keys 200 satisfying predetermined conditions, the electronic sound generating system 15*b* generates the tone identical in pitch name with the depressed key 200. However, if not, the tone generator 106 keeps the sound system 107 silent. The predetermined conditions are different between the educational modes as follows.

Consistent Key Mode

The electric tutor 15*a* gives a trainee notice that time comes when the trainee is to depressed key through the optical indicators 201. If the trainee correctly depresses the key to be depressed, the electronic sound generating system 15*b* generates the tone. However, if not, the tone generator 106 keeps the sound system 107 silent.

Consistent Key Change Mode

If the trainee depresses a key on the same side of the previously depressed key as the key to be depressed, the electronic sound generating system 15*b* generates the tone identical in pitch with the tone to be generated. However, if the trainee depresses a key on the opposite side to the key to be depressed, the tone generator 106 keeps the sound system 107 silent.

For example, the electric tutor 15*a* is assumed to give the trainee the notice that the trainee has to depress the key G3 and, thereafter, the key C4. The key C4 is on the right side of the key G3, and the tone C4 is higher in pitch than the tone G3. If the trainee depresses any one of the keys G#3, A3, A#3, B3, C4, on the right side of the key G3, the electronic sound generating system 15*b* generates the tone C4. However, if the trainee depresses a key on the left side of the key G3, the tone generator 106 keeps the sound system 107 silent.

Furthermore, the electric tutor 15*a* is assumed to give the trainee the notice that the trainee has to depress the key F#3 and, thereafter, D3. The key D3 is on the left side of the key F#3, and the tone D3 is lower in pitch than the tone F#3. In this situation, if the trainee depresses any one of the keys F3, E3, D#3, . . . on the left side of the previous key F#3, the electronic sound generating system 15*b* generates the tone D3. However, if the trainee depresses a key on the right side of the previous key F#3, the tone generator 106 keeps the sound system 107 silent.

Any-key Mode

A trainee is allowed to depress any key for generating a tone along a passage. Thus, the any-key mode is similar to the any-key mode for the first embodiment. However, the keys 200 are more than the keys 11/12, and the trainee may feel the any-key mode more difficult than that of the first embodiment.

Tracing Mode

The electric tutor 15*a* cooperates with the electronic sound generating system 15*b* in the tracing mode. The electric tutor 15*a* sinks the keys 200 and releases the depressed keys 200 along a passage, and the electronic sound generating system 15*b* generates the tones along the passage. In other words, the electric tutor 15*a* and the electronic sound generating system 15*b* give an exhibition to the trainee, and the trainee follows the guide. Thus, the tracing mode is similar to that of the first embodiment. However, the keys 200 are more than the keys 11/12, and the trainee may feel the tracing mode more difficult than that of the first embodiment.

Percussion Mode

The percussion mode is similar to that of the first embodiment, and the electronic sound generating system 15*b* generates various kinds of percussion sound depending upon the depressed key 200.

The computer programs for the second embodiment are analogous to those of the first embodiment, and, for this reason, the behaviors are not described hereinbelow.

The keyboard musical instrument may be fabricated on the basis of an electric keyboard, a silent piano, an automatic player piano or an automatic player piano with silent/electronic sound generating systems. These pianos will be described in detail in conjunction with the third embodiment.

Third Embodiment

Yet another keyboard musical instrument implementing the third embodiment is a compromise between the first embodiment and the second embodiment. The keys 11/12 are replaced with the keyboard 200, and the keyboard musical instrument has the optical indicator 201 instead of the optical indicators 13/14. The optical indicators 201 is connected to the LED driver 108, and the electric tutor 15*b* gives a trainee notice that the trainee is to depress a key through the optical indicators 201. The key actuators 109 are respectively associated with the eighty-eight keys 200, and the key sensors 110 monitors the eighty-eight keys 200, respectively. Although the keyboard musical instrument is equipped with the keyboard 200, i.e., the keyboard consisting of the eighty-eight keys, a trainee can assigns ten keys to the fingers of both hands, respectively.

The keyboard musical instrument may be fabricated on the basis of an electric keyboard, the silent piano, the automatic player piano or the automatic player piano with the silent/electronic sound generating systems.

Figure 10:
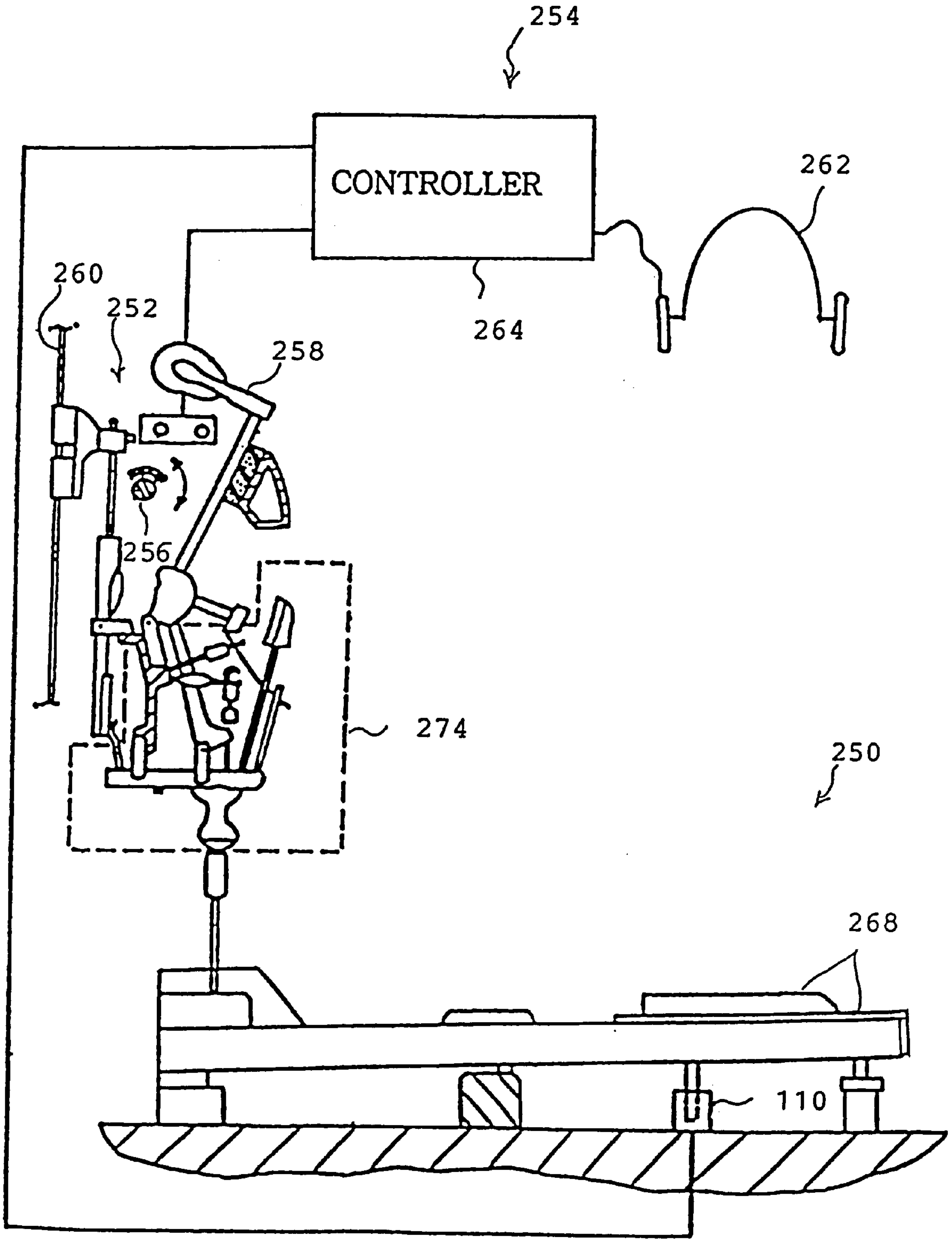
FIG. 10 is a side view showing the structure of a silent piano.

The silent piano according to the present invention comprises an acoustic piano 250, the silent system 252 and an electronic sound generating system 254 as shown in FIG. 10. A grand piano or an upright piano is available for the silent piano. The silent system 252 includes a hammer stopper 256 and a change-over mechanism (not shown). The hammer stopper 256 is provided between the hammers 258 and the sets of strings 260, and is changed between a free position and a blocking position by means of the change-over mechanism. The hammer stopper 256 in the free position is out of the trajectories of the hammers 258, and the acoustic piano 250 behaves as similar to a standard grand piano or a standard upright piano. When the hammer stopper 256 is changed from the free position to the blocking position, the hammers 258 rebound on the hammer stopper 256 before striking the strings 260, and any piano tone is not generated by the strings 260. The automatic playing system 254 includes the key sensors 110, a data processing system, the tone generator 106 and a headphone 262. The data processing system and the tone generator are incorporated in a controller 264 The key sensors 110 monitor the associated black/white keys 268, and the data processing system periodically checks the key sensors 110 for the current key positions of the black/white keys 268. When a player depresses a black/white key 268, the associated key sensor 110 periodically reports the current key position to the data processing system, and the data processing system determines the note number assigned to the depressed key 268 and the key velocity on the basis of the variation of the current key position. The data processing system produces a music data code for the note-on, and supplies it to the tone generator. The tone generator produces the tone signal, and supplies the audio signal to the headphone 262. Thus, the silent piano generates an electronic sound instead of the acoustic sound in the silent mode. When the player releases the depressed key 268, the data processing system determines the released key 268, and supplies a music data code for the note-off to the tone generator. The tone generator decays the tone signal, and, accordingly, the headphone 262 decays the electronic sound.

In the silent system, the electronic sound generating system 254 serves as a sound generating system, and the components of the electronic sound generating system 254 are shared with the electronic sound generating system 15*b*. The electric tutor 15*a* is implemented by the controller 264.

Figure 11:
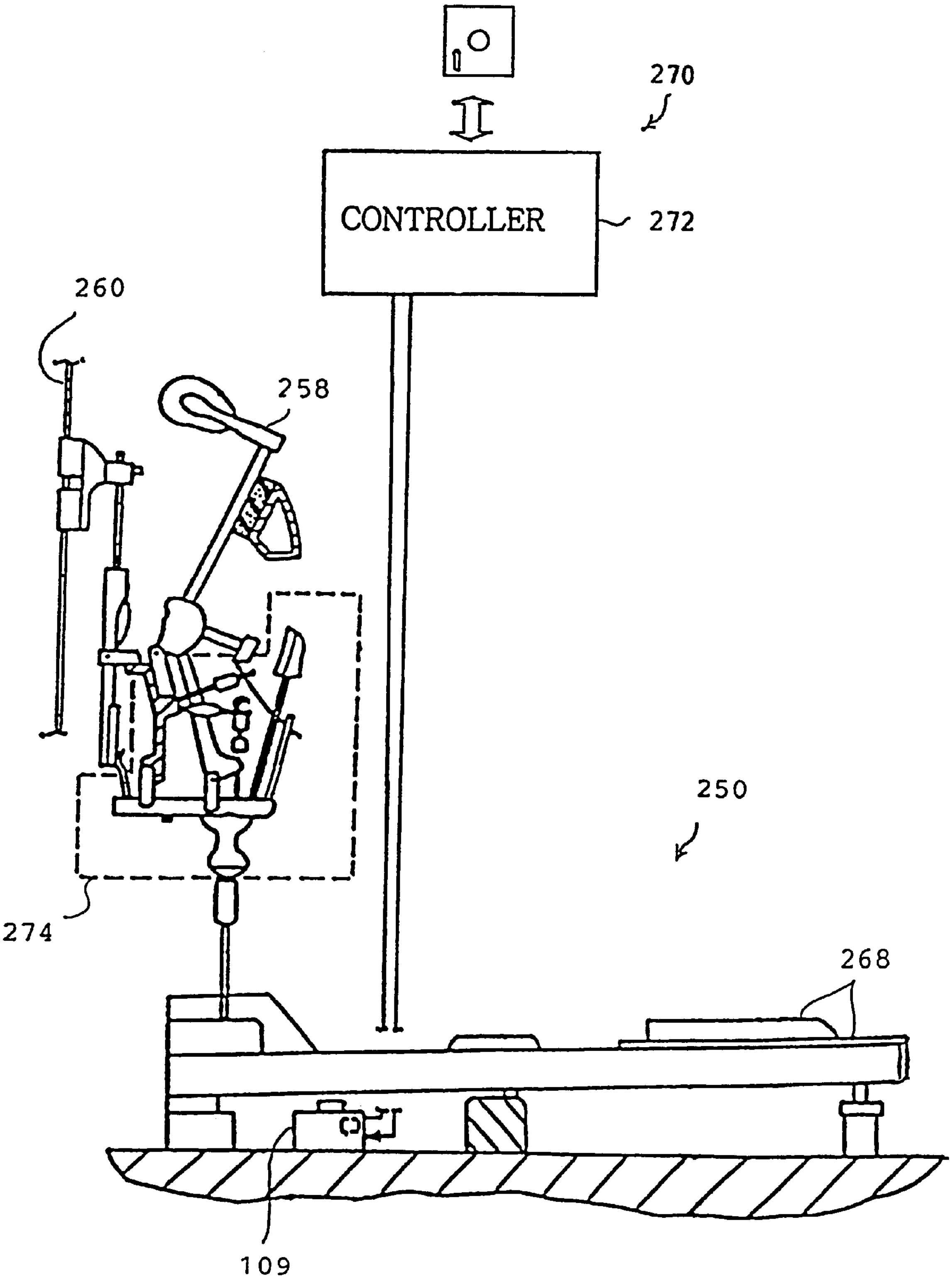
FIG. 11 is a side view showing the structure of an automatic player piano.

The automatic player piano according to the present invention is shown in FIG. 11, and comprises the acoustic piano 250 and an automatic playing system 270. The automatic playing system 270 includes the key actuators 109 and the data processing system. The data processing system sequentially reads out music data codes representative of a performance. When a music data code requests a note-on event, the data processing system determines the key 268 to be moved and the magnitude of a driving current signal corresponding to the key velocity. The data processing system instructs a driver circuit to supply the driving current signal to the key actuator 109, and the key actuator 109 projects the plunger. The driver circuit is incorporated in the controller 272 together with the data processing system. The plunger gives rise to the key motion from the rest position toward the end position, and the action mechanisms 274 are actuated. The action mechanism 274 gives rise to a free rotation of the associated hammer 258, and the hammer 258 strikes the set of strings 260. When a music data code represents a noteoff event, the data processing system instructs the driver circuit to remove the driving current signal from the associated key actuator 109. Thus, the automatic player piano performs the tune without fingering on the black/white keys 268.

If the automatic player piano is further equipped with the silent system 252 and the electronic sound generating system 254, the keyboard musical instrument behaves as similar to any one of the silent piano and the automatic player piano.

The automatic player piano is equipped with the electronic sound generating system 15*b* and the electric tutor 15*a*.

A trainee establishes the keyboard musical instrument implementing the third embodiment in a standard playing mode or any one of the five educational modes. When the trainee establishes the keyboard musical instrument in the educational mode, the trainee selects ten keys from the keyboard. The selected ten keys are equivalent to the ten keys 11*a* to 11*e* and 12*a* to 12*e*. Using the selected keys, the trainee practices the fingering. If the trainee depresses a key different from the selected ten keys, the tone generator 106 keeps the sound system 107 silent.

A player is assumed to establish the keyboard musical instrument in the standard playing mode. If the keyboard musical instrument is fabricated on the basis of the electric keyboard, the key sensors 110 monitor the associated eighty-eight black/white keys 200, and the electronic sound generating system 15*b* generates the electronic tones in synchronism with the depressed/released keys 200. On the other hand, if the keyboard musical instrument is based on the silent piano or the automatic player piano, the keyboard musical instrument behaves as similar to the silent piano or the automatic player piano.

On the other hand, when the trainee establishes the keyboard musical instrument in the educational mode, the trainee is requested to select ten keys from the keyboard 200. After manipulation of a switch on the manipulating panel 105, the electric tutor 15*a* requests the trainee to arbitrarily depress ten black/white keys 200. The depressed black/white keys 200 serve as the keys 11*a* to 11*e* and 12*a* to 12*e*, respectively. The selected keys may be adjacent to one another. Another trainee may select every other key from the keyboard 200. The electric tutor 15*a* memorizes the selected keys as the keys 11*a* to 11*e* and 12*a* to 12*e*, and assigns the five keys on the left side to the five fingers of the left hand and the other five keys on the right side to the five fingers of the right hand. The electric tutor 15*a* stores the relation between the selected keys and the ten fingers in the random access memory 103.

When the electric tutor memorizes the relation between the selected keys and the ten fingers, the central processing unit starts the execution along the loop in the main routine program (see FIG. 4), and periodically enters the timer interruption subroutine program (see FIG. 5). The main routine program sequentially branches to the subroutine programs shown in FIGS. 6, 7 and 8A to 8E. Although the central processing unit 101 checks the pieces of control data representative of the status of the black/white keys for a newly depressed key at step S301, the central processing unit 101 further checks the random access memory 103 to see whether or not the depressed key serves as one of the ten keys 11*a* to 11*e* and 12*a* to 12*e*. If the depressed key is appointed to one of the ten keys 11*a* to 11*e* and 12*a* to 12*e*, the central processing unit 101 proceeds to step S302. On the other hand, when the depressed key is not appointed to one of the keys 11*a* to 11*e* and 12*a* to 12*e*, the central processing unit 101 immediately returns to the main routine program.

Thus, a player uses the keyboard musical instrument implementing the third embodiment as a standard keyboard musical instrument such as, for example, the electric keyboard, the silent piano, the automatic player piano or the automatic player piano with the silent/electronic sound generating systems as well as the keyboard musical instrument implementing the first embodiment. A beginner may practice the fingering in the educational modes before playing a tune on the keyboard in the standard keyboard musical instrument.

In case where the keyboard musical instrument implementing the third embodiment is based on the silent piano, the hammer stopper may be changed to the blocking position in the educational modes.

Thus, the beginner stepwise changes the keyboard musical instrument implementing the third embodiment to the educational modes and the standard playing mode, and improves the fingering on the keyboard.

The electric tutor 15*a* and the electronic sound generating system 15*b* are implemented by the computer software. The computer programs may be installed in the electric keyboard, the silent piano and the automatic player piano. If the tone generator 106, the LED driver 108, the key actuators 109 and the key sensors 110 have been incorporated in the, the keyboard musical instrument, the computer software realizes the electric tutor 15*a* and the automatic playing system 15*b* in the keyboard musical instrument. Even if some component parts are not incorporated in a keyboard musical instrument, the component parts are added thereto, and the keyboard musical instrument is retrofitted to the keyboard musical instrument according to the present invention.

Fourth Embodiment

Figure 12:
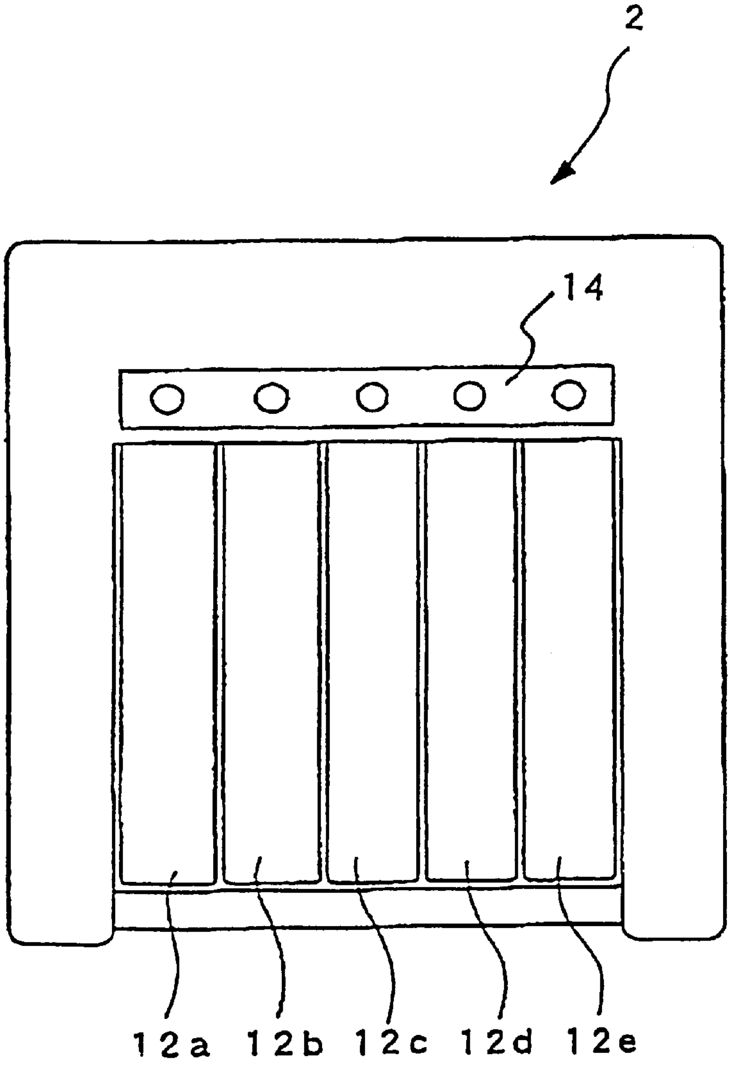
FIG. 12 is a plane view showing the external appearance of still another keyboard musical instrument according to the present invention.

FIG. 12 illustrates still another keyboard musical instrument 2 embodying the present invention. A player uses the keyboard musical instrument 2 as a standard keyboard musical instrument as well as a training keyboard. The keyboard musical instrument is used as the standard keyboard musical instrument in a standard playing mode. On the other hand, when the keyboard musical instrument is established in an educational mode, the keyboard musical instrument serves as the training keyboard. Although the first embodiment has five educational modes, the keyboard musical instrument has only one educational mode corresponding to the five finger exercise mode.

The keyboard musical instrument comprises five keys 12*a*/12*b*/12*c*/12*d*/12*e*, optical indicators 14 and the controller 15 (see FIG. 2). The keys 12*a* to 12*e* are respectively assigned to the five fingers of either left or right hand. The optical indicators 14 are respectively associated with the keys 12*a* to 12*e*, and the electric tutor 15*a* gives the player the notice that time comes when he or she is to depress the associated keys 12*a* to 12*e*.

A trainee is assumed to establish the keyboard musical instrument in the educational mode. The electric tutor 15*a* sequentially energizes the optical indicators 14 along a passage, and gives the trainee the notice through the optical indicators 14. If the trainee depresses the key identical with the key to be depressed, the electronic sound generating system 15*b* generates the tone on the basis of the piece of tone generation data. The electric tutor 15*a* sequentially changes the pitch names assigned to the five keys 12*a* to 12*e* along the passage. However, if the trainee depresses a key different from the key to be depressed, the tone generator 106 keeps the sound system 107 silent. Thus, the behavior in the educational mode is similar to that in the five finger exercise mode.

Although a trainee needs to change the home positions of both hands on the prior art keyboard along a passage, the trainee is not expected to change the home position on the keys 12*a* to 12*e*. The trainee concentrates his attention on the five fingers, and is experienced in the fingering on the keys 12*a* to 12*e* within a relatively short period.

Although particular embodiments of the present invention have been shown and described, it will be apparent to those skilled in the art that various changes and modifications may be made without departing from the spirit and scope of the present invention.

The controller 15 may be installed in a suitable casing separated from the housing 10.

The LED driver 108 may extinguish the optical indicator when the next key pressure comes. Otherwise, the LED driver 108 may keep the selected optical indicator 13/14 irradiate the light until the note-off event is read out.

The present invention never sets the limit of eighty-eight keys on the keyboard 200. A keyboard may have more than or less than eighty-eight keys.

The number of keys is not limited to five and ten. It is preferable to have the keys equal to a multiple of five, i.e., Sn where n is a natural number. A keyboard musical instrument according to the present invention may have two sets of ten keys, i.e., twenty keys. Two trainees exercise a duet on the two sets of keys.

Although the trainee selects ten keys from the keyboard of the second embodiment, the number of selected keys is not limited to ten. A keyboard musical instrument allows a trainee to select keys equal to a multiple of five from the keyboard. If the selected keys are five, the keyboard musical instrument behaves as similar to the fourth embodiment.

A keyboard musical instrument may have five keys as similar to the fourth embodiment. The electric tutor 15*a* energizes the optical indicators along one of the left/right parts. The other part may be automatically played through the electronic sound generating system 15*b*. Otherwise, the electric tutor ignores the other part. The keyboard musical instrument is simple and compact.

In the third embodiment, the keys are respectively assigned to the ten fingers. However, more than one key may be assigned to one finger. In this instance, the other fingers are respectively assigned other keys. For example, adjacent two keys are assigned to the thumb of the right hand, and the three keys on the right side of the two keys are respectively assigned the first finger, the middle finger and the ring finger, respectively. The remaining two keys on the right side are assigned to the little finger. The trainee needs to change the position of the thumb and the position of the little finger on the keyboard, and leans complicated fingering.

Another modification of the third embodiment may allow a trainee not to use a certain finger such as the ring finger. Beginners usually feel the manipulation with the ring finger difficult. In this instance, plural sets of pieces of music data are stored in the external memory 104. One of the plural sets of piece of music data is similar to that shown in FIGS. 3A and 3B. However, another set of pieces of music data does not contain pieces of event data representative of the key pressure for the unused finger or fingers. The trainee selects one of the sets of pieces of music data depending upon his skill. A trainee may firstly select a set of pieces of music data for only two fingers of each hand, and increases the fingers with time. Finally, the trainee uses the set of pieces of music data for ten fingers as shown in FIGS. 3A and 3B.

In the above-described embodiments, the electric tutor 15*a* gives the trainee the notice through the sense of sight, i.e., the optical indicators. Another electric tutor may give a trainee the notice through the hearing sense, the olfactory sense, the taste or the tactual sense. Japanese Patent Application No. 11-13418 teaches how the notice is given through the senses. The applicant of the Japanese Patent Application is same as the assignee of the present invention. For example, the electric tutor stores several instructions, and pronounces the instruction such as "depress the key with your thumb". Of course, an electric tutor may give a trainee the notice through tow of the senses such as, for example, the sense of sight and the hearing sense. In this instance, the electric tutor selectively energizes the optical indicators, and pronounces the instructions. Otherwise, another electric tutor may give a trainee the guide through the optical indicators and the electronic tones to be generated. The electronic tones previously generated are referred to as "guide tones", and the electronic tones generated at depressing correct keys are referred to as "confirmation tones". The guide tones may have the pitch and the loudness corresponding to the note number and the key velocity of a piece of tone generation data. The electric tutor may make the guide tones distinguishable from the confirmation tones. For example, the tone generator supplies the audio signal representative of the guide tones to the headphone and the audio signal representative of the confirmation tones to the speaker system. The guide tones and the confirmation tones may be radiated from the right side and the left side of the headphone. Otherwise, the guide tones and the confirmation tones may be produced in different tone colors.

The electric tutor may give a trainee the notice through the keys slightly sunk . The work B in the timer interruption subroutine is modified as follows. W h e n the register DUG( R or L) is decreased to zero, the central processing unit instructs the key actuator 109 associated with the key to be depressed to slightly project the plunger at step S110. Then, the key actuator 109 rotates the key by small angle, and the front portion of the key is slightly sunk. The key actuator 109 keeps the plunger for a short time period such as 0.5 second, and retracts the plunger. The trainee feels the key twitched, and is notified of the key to be depressed. It is important that the key motion for the notice does not result in a tone generation. The electric tutor may sink the front portion of the key by a depth visually confirmable in so far as the tone generator 106 keeps the sound system 107 silent. The depth may be 5 millimeters. The electric tutor may keep the slightly depressed key at the depth until the time when the note-on event takes place.

In the above-described embodiments, the pieces of tone generation data are sequentially transferred to the tone generator 106 at the timings when the time intervals expire. However, yet another modification may transfer the piece of tone generation data when the player depresses the keys. In other words, the pieces of duration data are ignored in the part or parts established in the educational mode. In this instance, the address assigned to the next piece of tone generation data is stored in the register AD(R or L) immediately after the transfer of the piece of tone generation data to the tone generator 106. In this instance, the central processing unit 101 may not ignore the pieces of duration data for the part established in the automatic playing mode. Otherwise, the central processing unit may synchronize the part established in the automatic playing mode with the other part established in the educational mode. Even so, the central processing unit may sequentially transfer the pieces of tone generation data for the part established in the automatic playing mode until the end of a passage, wait for the trainee, and start the next passage together with the trainee. This feature is desirable for beginners.

In still another modification, the controller 15 may separate a series of pieces of music data into the left part and the right part by itself as taught in Japanese Patent Publication of Unexamined Application No. 5-40474, the patent application of which was filed by the assignee of the present invention. The controller 15 may supplement the pieces of event data representative of the key pressure by itself as taught in Japanese Patent Publication of Unexamined Application No. 7-261750, the patent application of which was filed by the assignee of the present invention.

Figure 13:
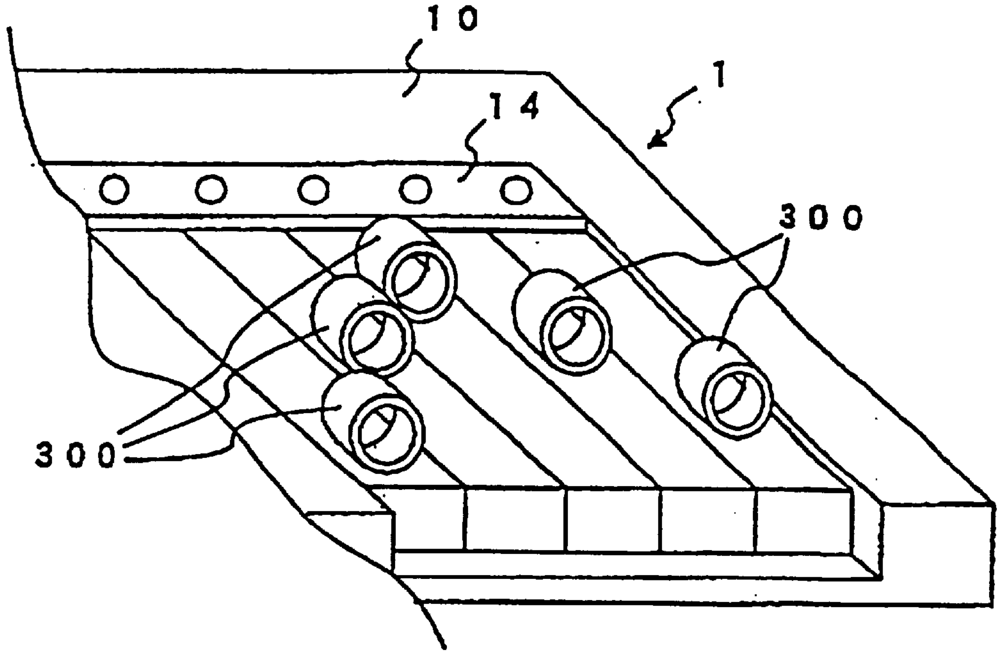
FIG. 13 is a perspective view showing a modification of the keyboard musical instrument according to the present invention.

Still another modification may have finger dampers 300 attached to the keys as shown in FIG. 13. The finger dampers 300 are formed from pieces of cloth, and is shaped in a ring configuration. The finger dampers 300 have diameters as large as the fingers. The finger dampers 300 are fixed to the keys, respectively, and a trainee inserts the five fingers into the finger clampers 300. In this instance, the electric tutor 15*a* forcibly moves the fingers together with the keys in the tracing mode, and teaches the trainee smooth fingering. The finger dampers 300 may be arranged on a virtual lateral line. However, the finger dampers 300 shown in FIG. 11 are located at the tips of the fingers, and allow the trainee to depress the keys as usual. The finger hidampers 300 may be detachable, because an experienced player does not need the finger dampers 300.

Figure 14:
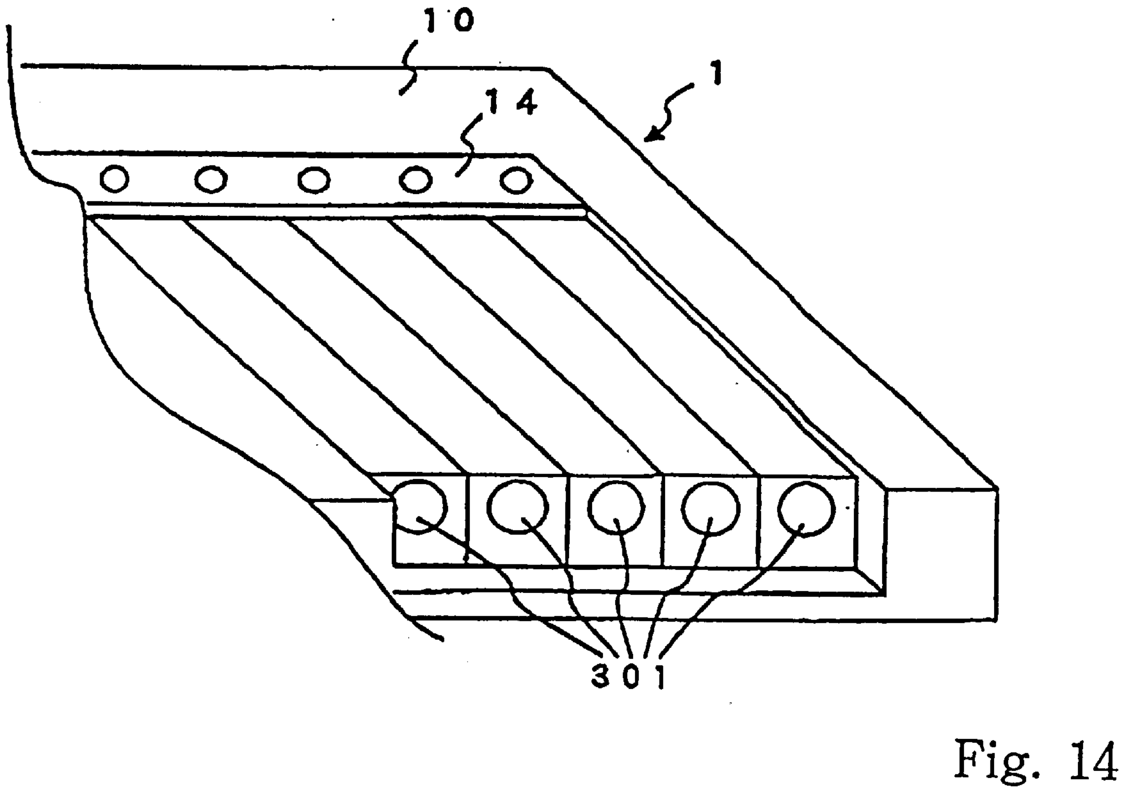
FIG. 14 is a perspective view showing another modification of the keyboard musical instrument according to the present invention.

The finger dampers 300 are replaceable with holes 301 open to the front end surfaces of the keys as shown in FIG. 14. The holes 301 are wider than the fingers, and, accordingly, the fingers are smoothly insertable. The holes 301 may have different depths corresponding to the five fingers. The hole 301 assigned to the middle finger is deep, and the holes 301 assigned to the thumb and the little finger are shallow.

Figure 15:
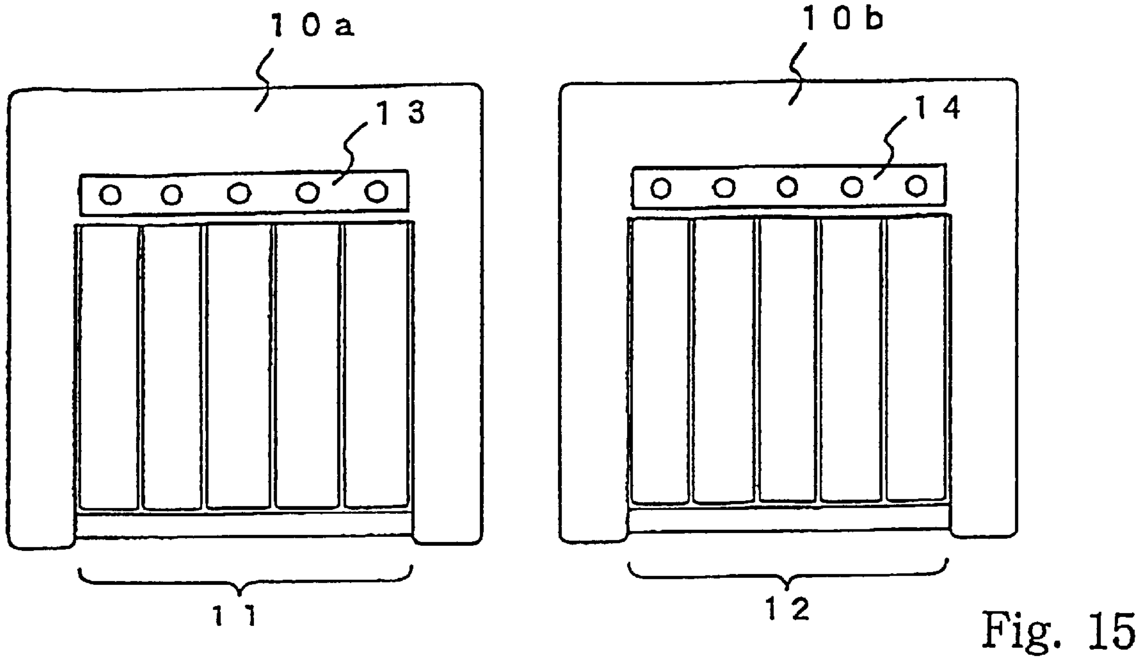
FIG. 15 is a plane view showing yet another modification of the keyboard musical instrument according to the present invention.

Yet another modification has the casing 1 separated into two parts 10*a*/10*b* where the sets of keys 11 and 12 are held together with the associated optical indicators 13/14 as shown in FIG. 15. A trainee spaces one of the two parts 10*a*/10*b* from the other by a gap appropriate to him. The trainee sits in comfortable attitude before the keyboard musical instrument.

Figure 16:
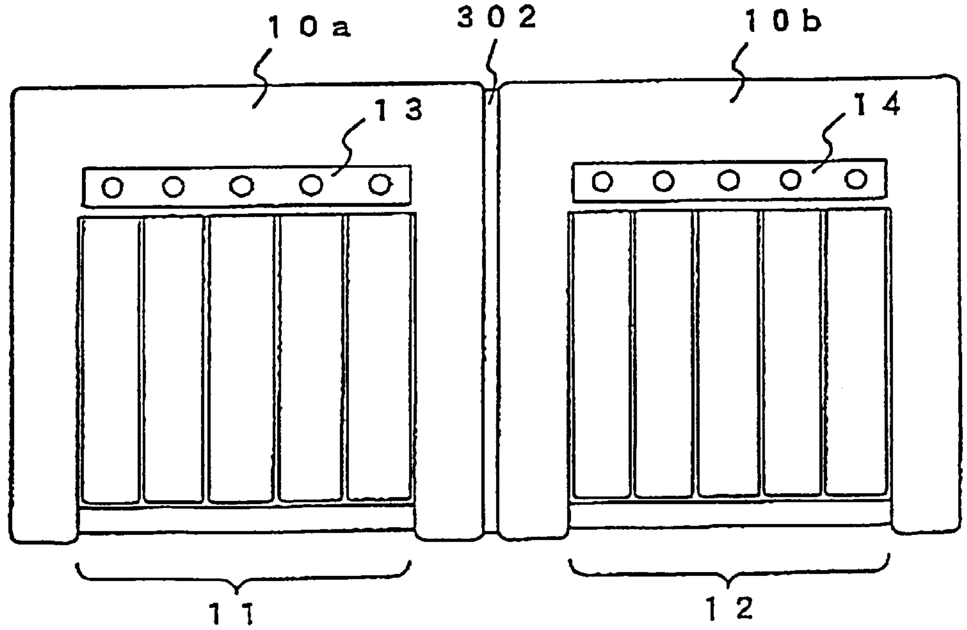
FIG. 16 is a plane view showing still another modification of the keyboard musical instrument according to the present invention.

Still another modification may have a flexible connector 302 between the parts 10*a* and 10*b* as shown in FIG. 16. A trainee folds back the keyboard musical instrument at the flexible connector 302. The flexible connector 302 enhances the portability of the keyboard musical instrument according to the present invention.

In the third embodiment, the eighty-eight optical indicators are required for the eighty-eight keys, because a trainee arbitrarily appoints ten keys to the keys used in the educational modes. However, a manufacturer may have selected ten keys from the keyboard. In this modification, only ten optical indicators are required, and the modification is simpler than the third embodiment.

In another modification of the third embodiment, when a trainee depresses a key not appointed in the educational mode, the electronic sound generating system 15*b* generates a tone identical in pitch name with the depressed key.

In yet another modification, the electric tutor may allow a trainee to establish the five keys in one of the five educational modes for the first embodiment and other five keys in one of the five educational modes for the second embodiment. The trainee can practice the fingering through a wide variety of educational mode.

The electric tutor 15*a* may transfer the pieces of tone generation data to another electric keyboard, another silent piano or another automatic player piano through an interface. Using the five keys or ten keys, a pianist plays a tune one the electric keyboard, the silent piano or the automatic player piano.

The ten or five keys may be selected from a left/right part of the keyboard incorporated in the silent/automatic player piano according to the present invention. The keys in the left/right parts are not used in playing some tunes. While a trainee is practicing the fingering on the selected keys, the silent/automatic player piano automatically plays a tune through the electronic sound generating system or the automatic playing system. In this instance, the hammer stopper may be split into two parts independently changed between the free position and the blocking position. One of the parts is associated with the selected keys, and the other part is associated with the remaining keys. In this instance, one of the parts is changed to the blocking position in the educational mode, and the other part is maintained in the free position so as to play the tune.

Still another modification may be a compromise between the second embodiment and the third embodiment. The compromise is established in any one of the educational modes.

The above-described embodiment may be partially realized by a personal computer. A central processing unit, a keyboard, a tone generator and software installed for tone generation may be used as the central processing unit 101, the keys 11/12, 200 or 268, the tone generator 106 and the computer program for the tone generation.

Figure 17:
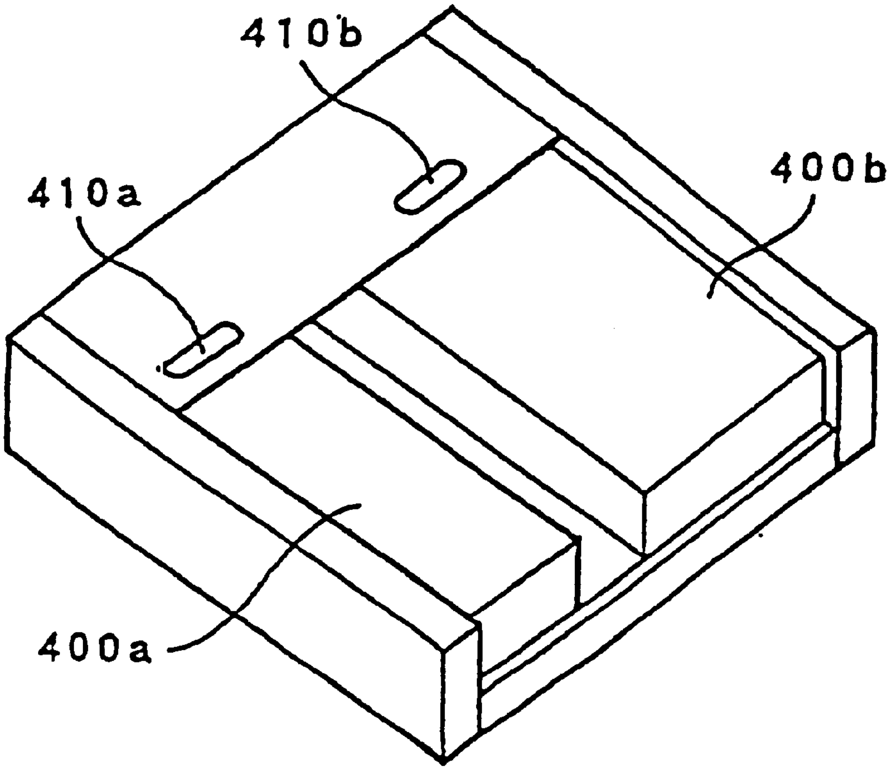
FIG. 17 is a perspective view showing yet another modification of the keyboard musical instrument according to the present invention.

Another modification of the fourth embodiment may assign more than one finger to a key. FIG. 17 illustrates the modification of the fourth embodiment. The modification has only two keys 400*a* and 400*b* and two optical indicators associated with the keys 400*a*/400*b*, respectively. The key 400*b* is wider than the key 400*a*. The key 400*a* is assigned to the thumb of the right hand, and the other key 400*b* is assigned to the other four fingers of the same hand. A trainee puts the thumb and the other four fingers on the key 400*a* and the other key 400*b*, respectively.

The electric tutor gives the trainee the notice through the optical indicators 410*a*/410*b* as follows. When a piece of even data representative of the key pressure is indicative of the notice for the thumb, then the electric tutor energizes the optical indicator 410*a* so as to radiate the light therefrom. If the player depresses the key 400*a*, the electronic sound generating system 15*b* generates the tone. However, if the piece of event data is indicative of the notice for any one of the first finger, the middle finger, the ring finger and the little finger, the electric tutor 15*a* energizes the optical indicator 410*b*. If the trainee depresses the key 400*b* with any one of the four fingers, the electronic sound generating system 15*b* generates a tone. The trainee is allowed to concentrate the attention on the thumb. The modification is suitable for beginners. The modification may be manipulated by the left hand. The trainee puts the thumb of the left hand on the key 400*b*, and the other four fingers of the same hand on the other key 400*a*. The key 400*a* and the other key 400*b* may be assigned to the thumb and the first finger of the right hand and the middle/ring/little fingers of the same hand.

Figure 18:
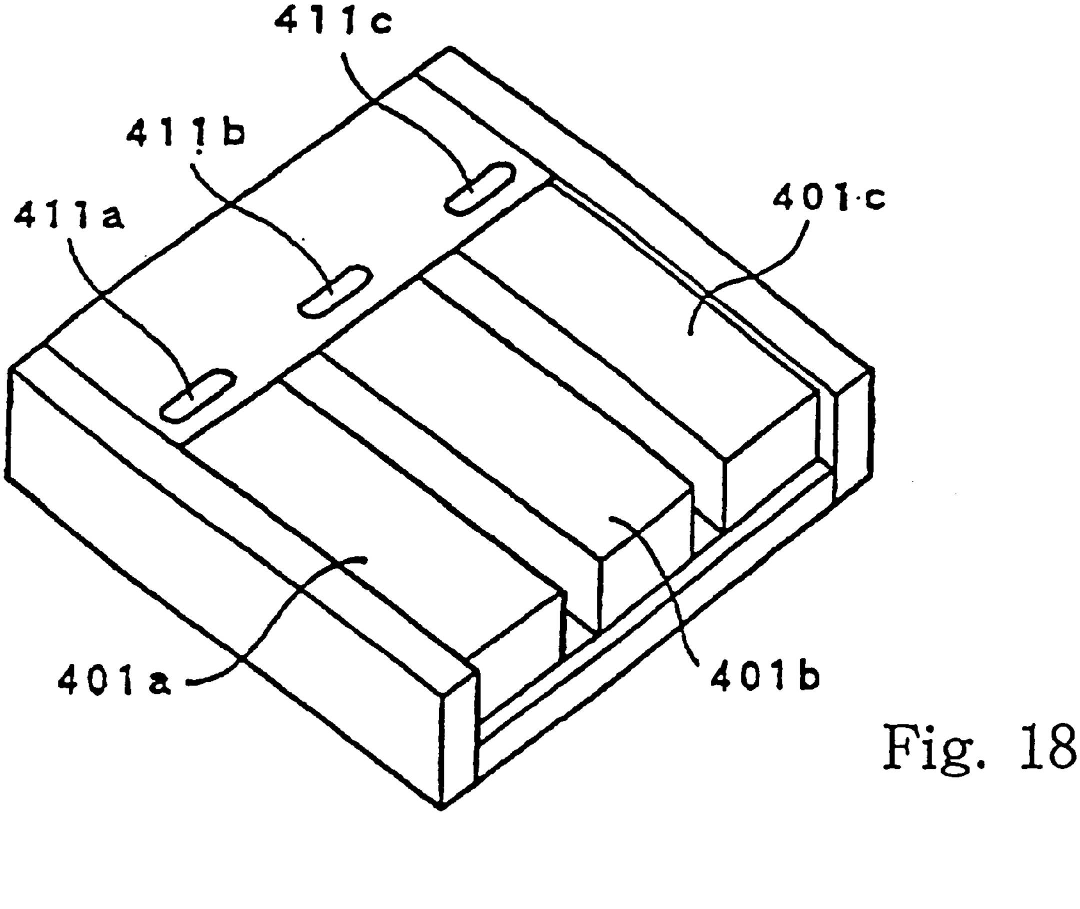
FIG. 18 is a perspective view showing still another modification of the keyboard musical instrument according to the present invention.

Yet another modification of the fourth embodiment has three keys 401*a*, 401*b* and 401*c* as shown in FIG. 18. The keys 401*a*/401*c*/401*b* are assigned to the thumb of the right hand, the little finger of the same hand and the other three fingers of the same hand, respectively. The electric tutor guides the trainee in practicing the fingering on the three keys 401*a*/401*b*/ 401*c* through the associated optical indicators 411*a*/411*b*/411*c*. The modification shown in FIG. 18 may be used for the left hand. In this instance, the keys 401*c* and 401*a* are assigned to the thumb and the little finger, respectively.

Figure 19:
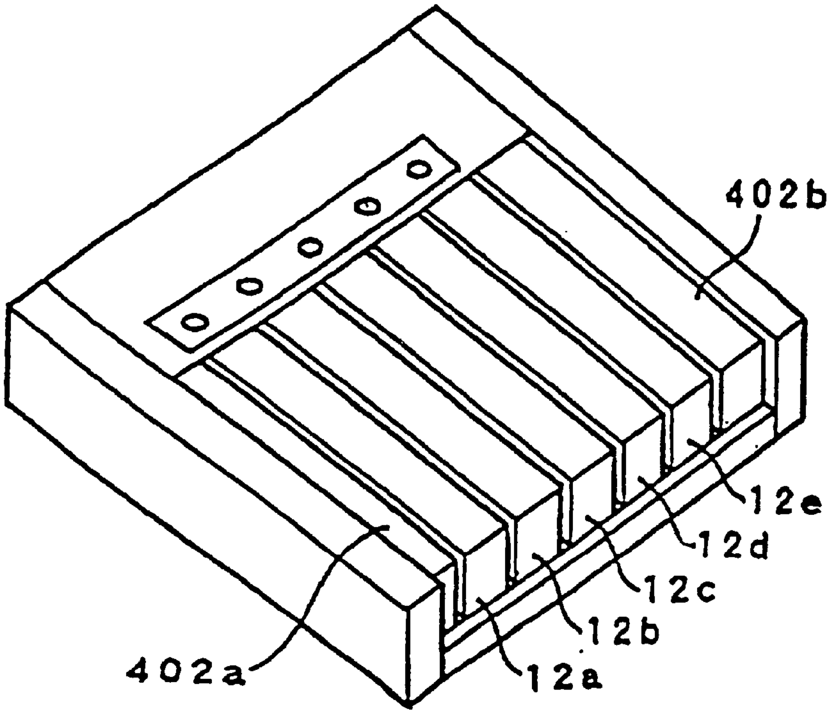
FIG. 19 is a perspective view showing yet another modification of the keyboard musical instrument according to the present invention.

A modification of the first and fourth embodiments may have more than five keys for either hand as shown in FIG. 19. The keys 12*a* to 12*e* are respectively assigned to the five fingers. The trainee may use the other keys 402*a*/402*b* for the following function.

The first example of the function is to give instructions to the electric tutor 15*a* and/or the electronic sound generating system 15*b*. The keys 402*a* and 402*b* may be used as the start switch and the stop switch. The keys 402*a*/402*b* may be used as the keys for an editor. The editor is similar to that disclosed in Japanese Patent Application No. 11-318653, the application of which is same as the assignee of the present invention. A player inputs pieces of control data representative of the fingers to be used into the controller through the five keys 12*a* to 12*e*, and enters the piece of control data by depressing the keys 402*a*/402*b*.

Another example of the function is used for the training in the thumb and the little finger. In an actual performance, a player is expected to widely space the thumb and the little finger from the other fingers to depress keys adjacent to the keys at the home positions. The keys 402*a*/402*b* are suitable for the training. When the keyboard musical instrument is established in a standard playing mode, the player selectively depresses the keys 12*a* to 12*e* for generating tones along a passage. However, if the trainee establishes the keyboard musical instrument in an educational mode for the widely spaced finger, the trainee depresses the keys 402*a*/402*b* with the thumb and the little finger. The trainee depresses the keys 12*b*/12*c*/12*d* with the other three fingers. If the trainee depresses the keys 12*a*/12*e*, the tone generator keeps the sound system silent. The keyboard musical instrument shown in FIG. 19 may be used for the left hand. Beginners think it difficult to depress keys on both sides of the home positions of the thumb and the little finger. Using the keyboard musical instrument, the beginners easily improve the skills. While the electric tutor guides a trainee in the fingering with the widely spaced thumb and little finger, the electric tutor gives the trainee the notice through the five optical indicators respectively associated with the keys 12*a* to 12*e*. Even so, the trainee is requested to depress the keys 402*a*/402*b* with the thumb and the little finger. In order to inform the trainee of the educational mode, the keyboard musical instrument may have an appropriate interface such as, for example, a liquid crystal display window (not shown). Otherwise, the electric tutor may draw the attention to the educational mode through a voice message. The keys 402*a*/402*b* may have resistance against the key motion larger than that against the key motions of the other five keys 12*a* to 12*e*. In this instance, the trainee is expected to exert large force on the keys 402*a*/402*b*, and acknowledges that he depresses the keys 402*a*/402*b* with the thumb and the little finger. Thus, the different load makes the trainee distinguish the keys 402*a*/402*b* through the inner force sense.

Figure 20:
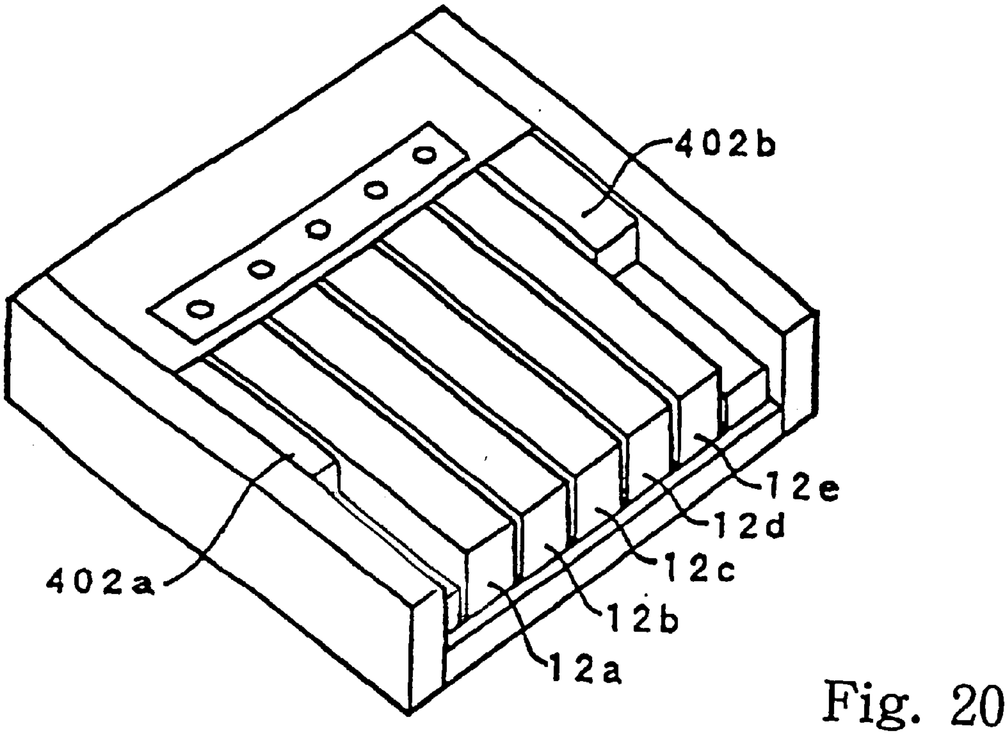
FIG. 20 is a perspective view showing still another modification of the keyboard musical instrument according to the present invention.

The additional keys 402*a*/402*b* may be differently shaped as shown in FIG. 20. The front portions of the keys 402*a*/402*b* are thinner than the remaining portions. When a trainee puts the thumb and the little finger on the keys 402*a*/402*b*, he distinguishes the additional keys 402*a*/402*b* from the other keys 12*a* to 12*e* through the sense of sight and the tactile sense.

Another modification may request a trainee to selectively use the keys 12*a*/12*e* and the additional keys 402*a*/402*b*. The electric tutor 15*a* usually guides the trainee in the fingering on the five keys 12*a* to 12*e* along a passage. When the trainee is expected to depress keys with the thumb or the little finger widely spaced in the passage, the electric tutor 15*a* instructs the trainee to depress the additional keys 402*a*/402*b* with the thumb and the little finger. A passage contains a wide interval between a note and the next note, and the trainee improves his skills through the above-described educational mode.

Figure 21:
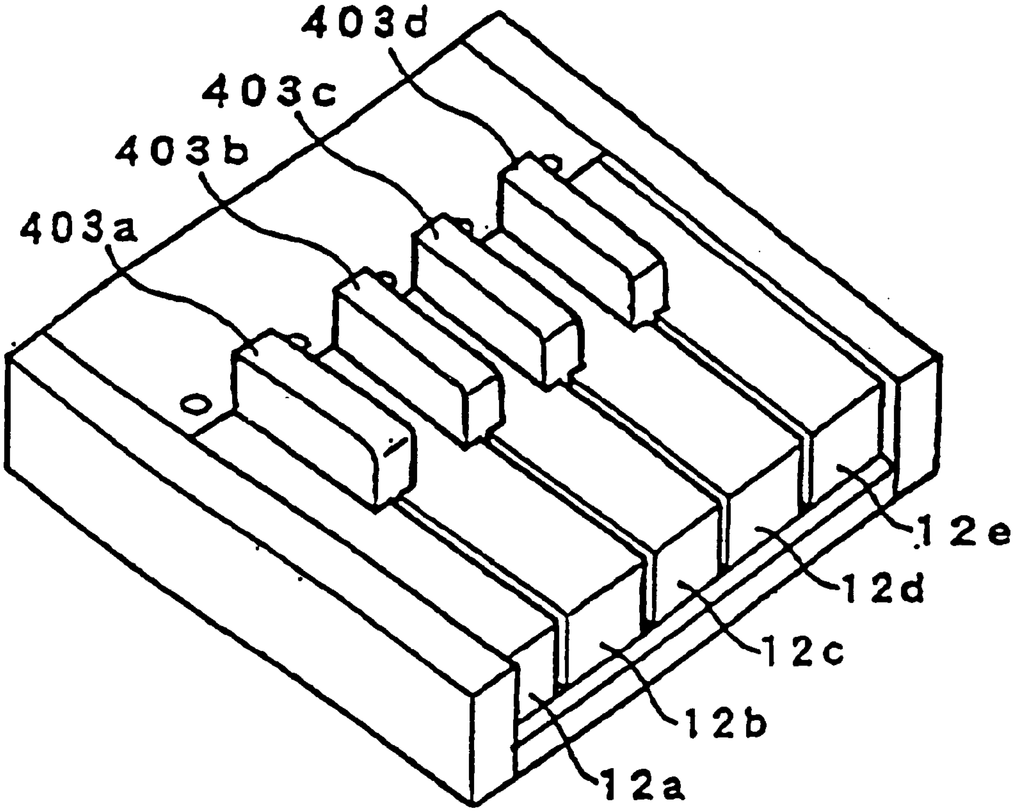
FIG. 21 is a perspective view showing yet another modification of the keyboard musical instrument according to the present invention.

Yet another modification may have additional keys 403*a*/403*b*/403*c*/403*d* between the keys 12*a* to 12*e* as shown in FIG. 21. The keys 12*a* to 12*e* and 403*a* to 403*d* are laid on the keyboard pattern of a standard acoustic piano. The keys 403*a* to 403*d* may be used as the switches on the manipulating panel 105. Otherwise, the electric tutor 15*a* may request a trainee to depress the additional keys 403*a* to 403*d* instead of the keys 12*a* to 12*d* in another educational mode for the black keys. While the keyboard musical instrument is operating in the standard playing mode, the trainee is playing a tune on the keys 12*a* to 12*e*. However, the trainee depresses the keys 403*a* to 403*d* and the key 12*e* with the thumb, the first finger, the middle finger, the ring finger and the little finger, respectively, in an educational mode. Thus, the trainee depresses the keys 403*a* to 403*d* as if they are black keys on the piano keyboard, and leans the fingering on the black keys. In this instance, the optical indicators are provided in association with the keys 12*a* to 12*e*. While the keyboard musical instrument is operating in the educational mode, the electric tutor 15*b* gives the trainee the notice that time comes when he is to depress the keys 403*a* to 403*d* through the optical indicator associated with the keys 12*a* to 12*d*. The trainee needs to bear in mind that the keyboard musical instrument is in the educational mode. If a liquid crystal display window is, by way of example, provided on the case, the electric tutor 15*a* produces character images indicative of the educational mode on the liquid crystal display window. Otherwise, the electric tutor may pronounce a massage such as “you are expected to depress the black keys”.

The keyboard musical instrument shown in FIG. 21 may have another educational mode in which a trainee is expected to selectively depress all the keys 12a to 12e and 403a to 403d. In this instance, the electric tutor 15a gives the trainee the notice only through the optical indicator for the keys 12a to 12e. However, the notice for the keys 403a to 403d may be given through an additional means such as the character images or the voice together with the optical indicators. This educational mode is suitable for an advanced training.

Figure 22:
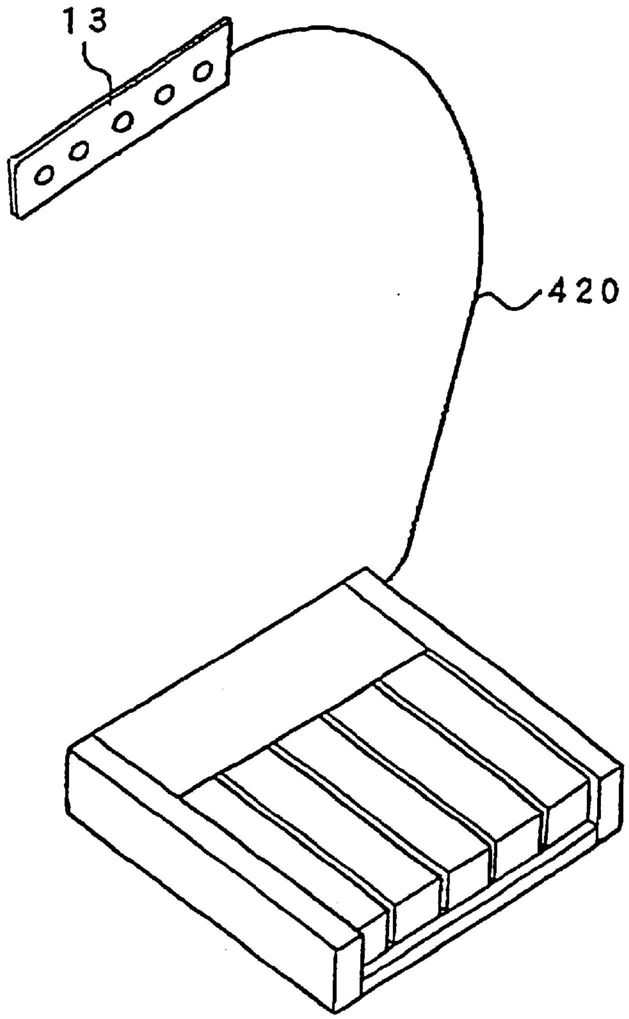
FIG. 22 is a perspective view showing still another modification of the keyboard musical instrument according to the present invention.

Still another modification may have the optical indicators provided on another case 13 connected through signal lines 420 to the controller 15 as shown in FIG. 22. The optical indicators connected through the signal lines 420 are desirable, because the trainee places the case 13 at any position easy to see. Moreover, although beginners tend to make their eyes fall on the keys, such a tendency is not desirable for a trainee of the middle class. If the trainee spaces the case 13 from the keys, the trainee breaks himself of the undesirable tendency.

Yet another modification changes the resistance against the keys in the educational mode. Beginners usually feel the keys assigned to the ring finger and the little finger weak points. The modification decreases the resistance against the keys assigned to the ring/little fingers. When the trainee feels those keys easy, the electric tutor may increases the resistance so as to train the ring/little fingers.

The keyboard according to the present invention may be applied to a training keyboard for a typist or a programmer. There are various kinds of training software for a typist, who inputs sentences and/or data into a personal computer or a word processor. While the personal computer is running on the training software, a sentence is produced on the display, and urges a trainee to input the sentence. The trainee depresses keys on the keyboard for inputting sentences. Then, the personal computer produces the character images on the display, and judges the sentence to see whether or not the trainee correctly depresses the keys. The trainee correctly selects the keys to be depressed. The keyboard usually has more than 40 keys, and the trainee changes the fingers from the home positions to other keys. Beginners feel the typing work difficult. The training keyboard allows a trainee to stepwise improve the skills.

Figure 23:
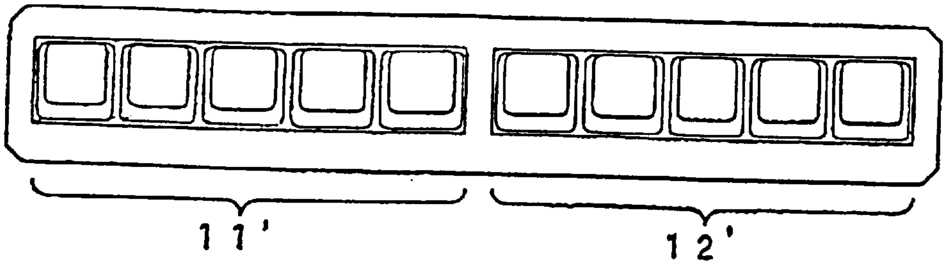
FIG. 23 is a plane view showing a training keyboard according to the present invention.

FIG. 23 illustrates a training keyboard. The training keyboard has only ten keys 11'/12', and the ten keys 11'/12' are respectively assigned to the ten fingers of the trainee. This means that the trainee does not need to change the finger from the home positions. Though not shown in FIG. 23, a monitor display is connected to a controller incorporated in the training keyboard, and the controller produces character images on the screen of the display.

The controller produces a sentence on the monitor display, and urges the trainee to selectively depress the keys 11'/12'. In a standard keyboard used for a personal computer, the layout of major keys is similar to that of a typewriter, and plural keys are assigned to each of the ten fingers. For example, character keys "Y", "H", "U", . . . are assigned to the first finger of the right hand, and character keys "I", "K", . . . are assigned to the middle finger of the right hand. Each of the ten keys 11'/12' is assigned to the plural key to be depressed by the associated finger.

Pieces of finger data representative of the fingers to be used are stored in the random access memory of the controller together with the pieces of training data representative of the characters of sentences. The central processing unit reads out the pieces of training data from the random access memory, and instructs a display driver to produce the characters of a sentence on the monitor display. When the trainee depresses a key, the key sensor informs the central processing unit that the trainee depresses the key. The central processing unit accesses the random access memory, and reads out the piece of finger data corresponding to the piece of the training data representative of the character. The central processing unit compares the depressed key with the key to be depressed, and determines whether or not the depressed key is identical with the key to be depressed. If the answer is affirmative, the central processing unit instructs the display driver to indicate that the trainee correctly depresses the key.

Thus, the trainee selectively depresses the ten keys without changing the fingers from the home positions, and stepwise improves the skills.

The training keyboard may have keys equal to a multiple of five, i.e., 5n where 5 is natural number. The ten keys may be selected from a keyboard consisting of more than ten keys.

In the above-described embodiments and the modifications, the electronic sound generating system 15b and the monitor display serve as an interface.

What is claimed is:

1. A training system for music performance, comprising:

an electric tutor guiding a trainee in fingering a passage of music on plural keys, each of said plural keys having two sides, and checking said plural keys to see whether or not said trainee manipulates keys on a predetermined side of a key previously manipulated in at least one educational mode; and a sound generating system cooperating with said electric tutor in said at least one educational mode, and generating a tone of said passage when said trainee manipulates one of said keys on said predetermined side, but not when said trainee manipulates one of said keys on a non-predetermined side.

2. The training system as set forth in claim 1, in which said plural keys are assigned to fingers of said trainee, respectively.

3. The training system as set forth in claim 2, in which said plural keys are equal to a multiple of five.

4. The training system as set forth in claim 3, in which said multiple is five.

5. The training system as set forth in claim 4, in which said trainee requests said electric tutor to give guide for one of a left part and a right part of said passage.

6. The training system as set forth in claim 3, in which said multiple is ten.

7. The training system as set forth in claim 6, in which halves of said plural keys are respectively retained by two cases separated from each other.

8. The training system as set forth in claim 6, in which halves of said plural keys are respectively retained by two cases, and said two cases are connected by a flexible connector so that said trainee can folds said two cases at said flexible connector.

9. The training system as set forth in claim 3, in which said electric tutor has finger dampers connecting said plural keys to said fingers, respectively.

10. The training system as set forth in claim 9, in which said finger dampers are detachable from said plural keys.

11. The training system as set forth in claim 9, in which said finger dampers are formed from pieces of cloth shaped in a ring, and are connected to the upper surfaces of said plural keys.

12. The training system as set forth in claim 9, in which said finger dampers are implemented by holes formed in said plural keys, respectively, so that said trainee inserts said fingers into said holes.

13. The training system as set forth in claim 2, further comprising additional keys forming an array of keys together with said plural keys and used for giving instructions to said electric tutor.

14. The training system as set forth in claim 2, further comprising additional keys forming an array of keys together with said plural keys and assigned to selected ones of said fingers, and said electric tutor requests said trainee to selectively manipulate said additional keys and two of said plural keys respectively assigned to said selected ones of said fingers.

15. The training system as set forth in claim 14, in which said additional keys are located on both sides of said plural keys, and are assigned to a thumb and a little finger of said trainee.

16. The training system as set forth in claim 15, in which said additional keys are thinner than said plural keys.

17. The training system as set forth in claim 14, in which said additional keys are provided between said plural keys, and are assigned to a thumb, a first finger, a middle finger and a ring finger of said trainee.

18. The training system as set forth in claim 17, in which said additional keys and said plural keys are lain on a pattern of a part of a piano keyboard.

19. The training system as set forth in claim 1, in which said plural keys form at least a part of a keyboard.

20. The training system as set forth in claim 19, in which said keyboard further has keys, and said trainee selectively manipulates said keys and said plural keys.

21. The training system as set forth in claim 20, in which said trainee appoints selected keys of said keyboard as said plural keys before starting training.

22. The training system as set forth in claim 1, in which said electric tutor further checks said plural keys to see whether or not said trainee selectively manipulates said plural keys sequentially specified along said passage in another educational mode, and said sound generating system generates a tone in said passage when said electric tutor determines that said trainee correctly manipulates the key specified along said passage.

23. The training system as set forth in claim 1, in which said electric tutor further checks said plural keys to see whether or not said trainee depresses any key arbitrarily selected by said trainee when said electric tutor gives said trainee notice that time comes when tones in said passage has to be generated in another educational mode, and said sound generating system sequentially generates said tones when said trainee responds to said notice.

24. The training system as set forth in claim 1, in which said electric tutor sequentially moves said plural keys by a part of a full stroke in another educational mode so as to urge said trainee to manipulate the keys by said full stroke, and said sound generating system generates tones along said passage.

25. The training system as set forth in claim 1, in which said electric tutor further has another educational mode where said electric tutor further checks said plural keys to see whether or not said trainee selectively manipulates said plural keys sequentially specified along said passage so that said sound generating system generates tones in said passage when said electric tutor determines that said trainee correctly manipulates the key specified along said passage, yet another educational mode where said electric tutor further checks said plural keys to see whether or not said trainee depresses any key arbitrarily selected by said trainee when said electric tutor gives said trainee notice that time comes when tones in said passage has to be generated so that said sound generating system generates said tones when said trainee responds to said notice, and still another educational mode where said electric tutor sequentially moves said plural keys by a part of a full stroke for urging said trainee to manipulate the keys by said full stroke so that said sound generating system sequentially generates tones along said passage.

26. The training system as set forth in claim 1, in which at least one of said plural keys are assigned to more than one of said fingers.

27. The training system as set forth in claim 26, in which said plural keys are assigned to a thumb and the other four fingers, respectively.

28. The training system as set forth in claim 27, in which said trainee requests said electric tutor to give guide for one of a left part and a right part of said passage.

29. The training system as set forth in claim 26, in which said plural keys are assigned to a thumb, a finger group consisting of a first finger, a middle finger and a ring finger and a little finger, respectively.

30. The training system as set forth in claim 29, in which said trainee requests said electric tutor to give guide for one of a left part and a right part of said passage.

31. The training system as set forth in claim 1, in which said electric tutor includes a program memory storing at least computer programs for guiding said trainee in fingering along said passage, a working memory storing piece of music data representative of tones in said passage to be generated and timing to generate said tones, an interface to said trainee for giving said trainee a guide that said timings come when said tones are to be generated, a data processing unit selectively running on said computer programs for processing said piece of music data so as to instruct said interface to give said guide, and key sensors monitoring said plural keys to see whether or not said trainee follows said guide in fingering on said plural keys.

32. The training system as set forth in claim 31, in which said interface is a plurality of optical indicators respectively associated with said plural keys.

33. The training system as set forth in claim 32, in which said plurality of optical indicators is provided on a case connected through a flexible signal line to another case where at least said program memory, said working memory and said data processing unit are housed.

34. A keyboard musical instrument selectively established in a performance mode and at least one educational mode, comprising:

plural keys selectively depressed by a trainee; and a music performance trig system including an electric tutor guiding a trainee in fingering a passage of music on said plural keys, each of said plural keys having two sides, and checking said plural keys to see whether or not said trainee depresses keys on a predetermined side of a key previously depressed in said at least one educational mode, and a sound generating system cooperating with said electric tutor is said at least one educational mode and generating a tone of said passage when said trainee depresses one of the said keys on said predetermined side, but not when said trainee depresses one of said keys on a non-predetermined side.

35. The keyboard musical instrument as set forth in claim 34, in which said plural keys form at least a part of a keyboard of an acoustic piano.

36. The keyboard musical instrument as set forth in claim 35, in which said acoustic piano further includes action mechanisms respectively actuated by the keys of said keyboard, hammers respectively driven for rotation by said action mechanisms, and music strings respectively struck with said hammers for generating acoustic tones.

37. The keyboard musical instrument as set forth in claim 36, further comprising a silent system having a hammer stopper changed between a free position and a blocking position, said hammers rebounding on said hammer stopper in said blocking position before said hammers strikes said music strings, said hammer stopper in said free position allowing said hammers to strike said musical strings, and a sound generating system generating sounds corresponding to said acoustic tones.

38. The keyboard musical instrument as set forth in claim 36, further comprising an automatic playing system having plural key actuators respectively associated with the keys of said keyboard and selectively energized for moving said keys without fingering of said trainee.

39. A training keyboard for training a trainee in typing, comprising:

plural keys respectively assigned to fingers of said trainee, and respectively representing plural object groups each including plural objects;

an electric tutor selectively specifying said plural keys to be manipulated for the objects respectively selected from the associated plural object groups, and judging the keys manipulated by said trainee to see whether or not said trainee correctly manipulated said plural keys; and an interface between said electric tutor and said trainee for informing said trainee of the judgement made by said electric tutor.

* * * * *